(12) United States Patent  
Toyota et al.

(10) Patent No.: US 8,088,325 B2  
(45) Date of Patent: Jan. 3, 2012

(54) ARTICLES AND METHODS OF MAKING ARTICLES HAVING A CONCAVITY OR CONVEXITY

(75) Inventors: Atsushi Toyota, Tokyo (JP); Shoichi Masuda, Tokyo (JP)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 12/743,350

(22) PCT Filed: Oct. 14, 2008

(86) PCT No.: PCT/US2008/079797  
§ 371 (c)(1),  
(2), (4) Date: Jul. 29, 2010

(87) PCT Pub. No.: WO2009/067308  
PCT Pub. Date: May 28, 2009

(65) Prior Publication Data  
US 2010/0323184 A1      Dec. 23, 2010

Related U.S. Application Data

(60) Provisional application No. 60/988,994, filed on Nov. 19, 2007.

(51) Int. Cl.  
*B29C 49/00* (2006.01)

(52) U.S. Cl. .......................................... 264/544; 264/523

(58) Field of Classification Search .................. None  
See application file for complete search history.

(56) References Cited

U.S. PATENT DOCUMENTS

| | | | |
|---|---|---|---|
| 6,224,817 B1 * | 5/2001 | Villers | ............................ 264/503 |
| 6,322,652 B1 | 11/2001 | Paulson | |
| 6,417,831 B2 | 7/2002 | Kashima | |
| 6,709,258 B2 | 3/2004 | Paulson | |
| 6,752,505 B2 | 6/2004 | Parker | |
| 6,758,992 B2 | 7/2004 | Solomon | |
| 6,761,607 B2 | 7/2004 | Kikuchi | |
| 6,864,951 B1 | 3/2005 | Ren | |
| 7,144,539 B2 | 12/2006 | Olsson | |
| 7,182,875 B2 | 2/2007 | Joseph | |
| 7,220,026 B2 | 5/2007 | Ko | |
| 7,252,428 B2 | 8/2007 | Lee | |
| 7,295,374 B2 | 11/2007 | Chang | |

(Continued)

FOREIGN PATENT DOCUMENTS

JP          62260104          11/1987

(Continued)

OTHER PUBLICATIONS

Chang, "Fabrication of Plastic Microlens Array Using Gas-assisted Micro-hot-embossing with a Silicon Mold", Infrared Physics & Technology, 2006, vol. 48, pp. 163-173.

(Continued)

*Primary Examiner* — Monica A Huson  
(74) *Attorney, Agent, or Firm* — Adam Bramwell; Kristofor L. Storvick; Robert S. Moshrefzadeh

(57) ABSTRACT

Articles and methods of making an articles having at least one convexity or at least one concavity are described. A first article having at least one concavity is prepared using a molding surface that includes at least one gas bubble. A second article having at least one convexity is prepared using the first article as a mold.

17 Claims, 13 Drawing Sheets

U.S. PATENT DOCUMENTS

| | | |
|---|---|---|
| 7,320,538 B2 | 1/2008 | Ko |
| 7,672,049 B2 | 3/2010 | Fruhmann |
| 2004/0159975 A1 | 8/2004 | Cox |
| 2005/0003195 A1 | 1/2005 | Joseph |
| 2005/0008862 A1 | 1/2005 | Joseph |
| 2005/0218548 A1 | 10/2005 | Preston |
| 2006/0039073 A1 | 2/2006 | Lee |
| 2007/0183050 A1 | 8/2007 | Etori |
| 2007/0262049 A1 | 11/2007 | Miyajima |
| 2008/0099175 A1 | 5/2008 | Chu |
| 2008/0259449 A1 | 10/2008 | Fruhmann |
| 2010/0290250 A1 | 11/2010 | Toyota |

FOREIGN PATENT DOCUMENTS

| | | |
|---|---|---|
| JP | 3198003 | 8/1991 |
| JP | 5134103 | 5/1993 |
| JP | 3732252 | 11/1996 |
| JP | 3732253 | 11/1996 |
| JP | 10186110 | 7/1998 |
| JP | 11142609 | 5/1999 |
| JP | 2000/298201 | 10/2000 |
| JP | 2003/329809 | 11/2003 |
| JP | 2008/522204 | 6/2008 |
| KR | 10-2001-0074953 | 8/2001 |
| KR | 10-2006-0126565 | 12/2006 |

OTHER PUBLICATIONS

Teipen, "Modulation Transfer Function Measurements of Microjetted Microlenses", Applied Optics, Apr. 1, 1999, vol. 38, No. 10, pp. 2040-2046.

International Search Report for PCT/US2008/079797, 4 pgs, Feb. 2009.

Written Opinion of the ISA for International Application No. PCT/US2008/079797, 4 pgs, Feb. 2009.

International Search Report for PCT/US2008/083898, 3 pgs, Jun. 2009.

Written Opinion of the ISA for International Application No. PCT/US2008/083898, 6 pgs, Jun. 2009.

* cited by examiner

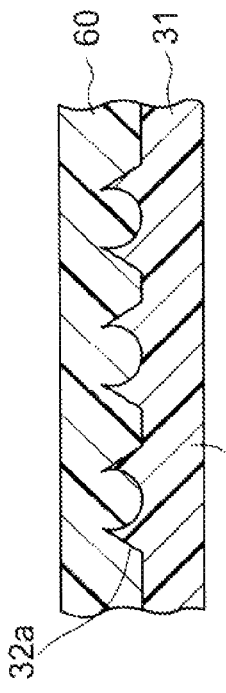
FIG. 6A CASE 1
FIG. 6C CASE 2
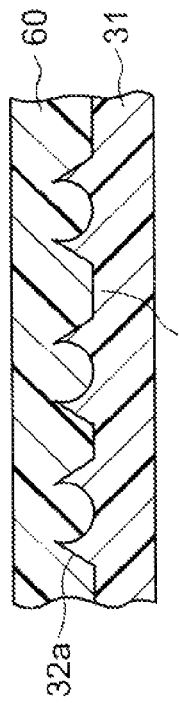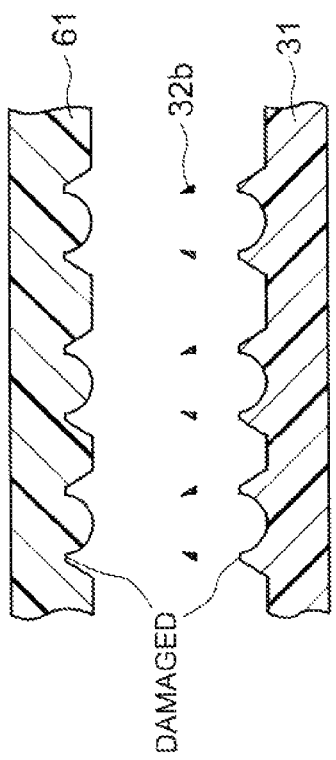
FIG. 6B
FIG. 6D

ARTICLES AND METHODS OF MAKING ARTICLES HAVING A CONCAVITY OR CONVEXITY

CROSS REFERENCE TO RELATED APPLICATIONS

This application is a national stage filing under 35 U.S.C. 371 of PCT/US2008/079797, filed Oct. 14, 2008, which claims priority to U.S. Provisional Application No. 60/988,994, filed Nov. 19, 2007, the disclosure of which is incorporated by reference in its/their entirety herein.

FIELD OF THE INVENTION

The present invention relates to articles and methods of manufacturing articles that have at least one concavity or convexity.

BACKGROUND OF THE INVENTION

An article having a component with a concave surface or a convex surface or an article having a number of concave surfaces or convex surfaces arranged thereon can be used in various industrial fields. In some applications, the concave or convex surface can function as a lens. For example, a sheet-like article having a number of concave surfaces or convex surfaces arranged thereon can function as an array of lenses such as an array of microlenses (i.e., microlens array). Such a sheet-like article that can be used as a microlens array has recently received a great amount of attention. Microlens array may be suitable for various optical applications including, for example, a display, a semiconductor laser, and an optical fiber.

Japanese Patent Application Laid-Open No. H11-142609 describes a manufacturing method for a microlens array using an indentation method. According to this manufacturing method, many indentations are formed on the surface of a mold using a pressing tool. The pressing tool, which has a spherical shaped head of different sizes, is repeatedly pressed on the surface of the mold at regular intervals. A microlens array can then be manufactured by compression molding an optical-grade plastic, such as an acrylic polymer, using the mold having the indentations formed thereon. However, the manufacturing method of a microlens array using this indentation method requires considerable time and cost because of the amount of work needed to form the mold with many indentations.

Japanese Patent Application Laid-Open No. H05-134103 describes a manufacturing method for a microlens array using an electron-beam lithographic method. In this manufacturing method, many microlenses can be formed on a base sheet using an electron beam. Like the indentation method for manufacturing a microlens array, this method requires considerable time and cost. It could take greater than ten days to several hundred days to manufacture more than ten thousand to several hundred thousand microlenses with each microlens having a diameter of about 100 micrometers (μm), for example.

Japanese Patent Application Laid-Open No. S62-260104 describes a manufacturing method for a microlens using a laser chemical vapor deposition (CVD) method. In this manufacturing method, a substrate is set in a container filled with a mixed gas composition, a laser beam is irradiated on the substrate to decompose the gas composition, and a lens material is deposited on the substrate to form the microlens. The desired shape can be obtained by changing the energy distribution of the laser beam to vary the amount of material deposited on the substrate. However, because each microlens is formed individually by finely changing the energy distribution of the laser beam, this manufacturing method is slow and costly.

Japanese Patent Application Laid-Open No. H05-134103 describes a manufacturing method for a microlens array that includes preparing a lattice frame, placing a resin within the lattice frame, and melting the resin to form curved surfaces suitable for microlenses by means of the surface tension of the melted resin. Although an article having a convex surface can be manufactured relatively easily with this manufacturing method in comparison with the aforementioned electron-beam lithographic method and laser chemical vapor deposition method, it is necessary to prepare the lattice frame using a photoresist prior to forming microlenses. The method of preparing the lattice frame can be complicated. Therefore, the overall steps of manufacturing a microlens array using this method can be time consuming and costly. Further, because this manufacturing method includes the step of melting the photo-resist or resin material, the range of suitable materials that can be used is limited. It can be difficult to find materials that have suitable melting properties as well as suitable optical properties.

C. Y. Chang et al. reported a manufacturing method for a microlens array made of a resin material in *Infrared Physics & Technology*, 48, pp. 163-173 (2006). In this manufacturing method, a resin film is set on a mold disposed in a closed chamber and then heated. High gas pressures are used to extrude the resin film into dimples of the mold, thereby forming convex surfaces. The size and shape of the convex surfaces that can be formed are limited, however, because the hardened resin film must be reheated to form the microlenses. Additionally, since this method involves high-temperatures and high gas pressures, the manufacturing cost can be high.

Easier methods are desired for manufacturing an article having at least one concavity or at least one convexity on its surface. More particularly, easier methods are desired for manufacturing an article having at least one micro-concavity or at least one micro-convexity on its surface.

SUMMARY OF THE INVENTION

The present invention relates to articles and to methods of manufacturing the articles that have at least one concavity or convexity. More particularly, an article having at least one concavity is manufactured using a molding surface that includes at least one gas bubble. This article having at least one concavity can then be used as a second mold to form a second article having at least one convexity.

One aspect of the present invention is a method of making an article that has a surface comprising at least one concavity. The method comprises using at least one gas bubble deliberately introduced to impart the at least one concavity to the surface of the article.

In some embodiments of this method, multiple gas bubbles arranged in a pattern are used to impart an arranged pattern of concavities to the surface of the article.

Another aspect of the present invention is a method of making a second article that has a surface comprising at least one convexity. The method comprises using the article having at least one concavity as a second mold to impart the at least one convexity to the surface of the second article. In some embodiments of this method, the first article that is used as the second mold has an arranged pattern of concavities and the second article has an arranged pattern of convexities.

Yet another aspect of the present invention is an article that has a surface comprising an arranged pattern of concavities, wherein gas bubbles imparted the arranged pattern of concavities to the surface of the article during its manufacture.

Still another aspect of the invention is a second article having a surface comprising an arranged pattern of convexities. The arranged pattern of the convexities is an inversion of an arranged pattern of concavities of a second mold, wherein gas bubbles imparted the arranged pattern of concavities to a surface of the second mold during its manufacture.

BRIEF DESCRIPTION OF THE DRAWINGS

FIGS. 6A to 6D are schematic sectional views exemplifying other embodiments of a method of manufacturing a second article having at least one convexity.

DETAILED DESCRIPTION OF THE INVENTION

Figure 1A:
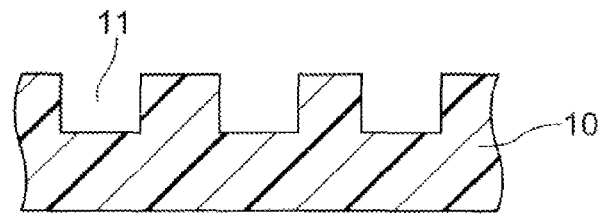
FIGS. 1A to 1D are schematic sectional views exemplifying one embodiment of a method of manufacturing a first article having at least one concavity.

Articles are provided that have at least one concavity or at least one convexity. Methods of making these articles are also provided. The at least one convexity or concavity of the articles can be used, for example, as a lens or as an array of lenses. In some embodiments, the at least one convexity or concavity of the article can be used as a microlens or an array of microlenses (i.e., a micrlens array). As used herein, the term "microlens" refers to a lens having a dimension such as a diameter in the range of about 0.1 micrometer to about 1000 micrometers. The microlens corresponds to a micro-convexity or micro-concavity on the surface of the article. As used herein, the terms "micro-concavity" and "micro-convexity" refer respectively to a concavity or convexity having a diameter in the range of about 0.1 micrometer to about 1000 micrometers. As used herein, the term "diameter" when referring to a concavity or convexity corresponds to the largest cross-sectional dimension.

According to one aspect of the present invention, an article that has a surface comprising at least one concavity can be manufactured. During manufacture, at least one gas bubble is deliberately introduced to impart the at least one concavity to the surface of the article. More particularly, the article is manufactured using a molding surface that includes at least one gas bubble. That is, an article can be manufactured by a method the comprises: (a) providing a hardenable fluid; and (b) molding the article from the hardenable fluid using a molding surface comprising at least a portion of an outer surface of a gas bubble.

Multiple concavities such an arranged pattern of concavities can be formed on the surface of the article using a molding surface that includes a plurality of gas bubbles located at different positions on the molding surface. That is, an article with an with an arranged pattern of concavities can be manufactured using a method that comprises: (a) providing a hardenable fluid; and (b) molding the article from the hardenable fluid using a molding surface comprising at least a portion of an outer surface of multiple gas bubbles, wherein the multiple gas bubbles are arranged in the pattern on the molding surface.

A smooth concave surface, which is the inversion of a portion of the smooth convex surface of the gas bubble, can be imparted to the article. In contrast to this relatively easy manufacturing method, similar surfaces have conventionally been formed using complicated manufacturing processes.

The terms "a", "an", and "the" are used interchangeably with "at least one" to mean one or more of the elements being described.

The term "at least one concavity" refers to a single concave surface or to multiple concave surfaces. The single or multiple concave surface can be imparted to the article using a single gas bubble introduced at a single position on the molding surface or using multiple gas bubbles introduced at a plurality of positions on the molding surface. Multiple concavities can be located or arranged in random or arbitrary positions or arranged in a pattern on the surface of the article.

As used herein, the term "deliberately introducing" means introducing gas bubbles for the purpose of using them as a substantial tool in the process of making the articles. That is, the gas bubbles are part of the molding surface that is used to impart the at least one concavity to the surface of the article. In some embodiments, the term deliberately introducing means not removing or entrapping any gas bubbles that may already be present. For example, deliberately introducing can mean not removing any gas bubbles that may be positioned in one or more depressions of a mold during application of the hardenable fluid to a portion of the mold. That is, deliberately introducing can mean entrapping a gas bubble in a depression of a mold prior during application of the hardenable fluid to a portion of the mold. An entrapped gas bubble is part of the molding surface that contacts the hardenable fluid.

In some embodiments, an article that has a surface comprising an arranged pattern of concavities can be manufactured. During manufacture, gas bubbles are supplied at a plurality of positions to impart the arranged pattern of concavities to the surface of the article. More specifically, the articles are manufactured using a molding surface that includes a plurality of gas bubbles arranged in a pattern that corresponds to the pattern of concavities imparted to the article. The article having the arranged pattern of concavities can be easily manufactured.

The "arranged pattern of concavities" is a pattern of a plurality of concavities arranged at predetermined positions, arranged with some degree of regularity, or arranged in any desired manner. For example, the arranged pattern of concavities can include an arranged row pattern, an arranged lattice pattern such as an arranged square lattice pattern, an arranged zigzag pattern, or an arranged radial pattern. The arranged pattern of concavities need not be formed evenly on the entire article, but may be formed in only a portion of the article. The pattern of concavities may vary or remain the same over any portion of the article. For example, similar or different patterns can be used within the same plane. The concavities within the pattern can be of the same size and shape or can have different sizes and shapes.

Any suitable gas can be used to form the gas bubble that imparts a concavity to the surface of an article. For example, the gas can be air or an inert gas including nitrogen and argon. The molding surface that is used to form the article includes a portion of the outer surface of at least one gas bubble. The outer shape of the gas bubble included in the molding surface, which is in contact with the hardenable fluid, can be inversely transferred to the article. Since gas bubbles with various shapes and sizes having diameters ranging from a few nanometers to several centimeters or more can be included in the molding surface, it is possible to form concavities with a wide range of shapes and sizes. Further, when multiple concavities are formed in the article, the multiple concavities can have the same size and shape or can have different sizes and shapes. That is, the molding surface can include multiple gas bubbles having different sizes and shapes or the same size and shape.

One embodiment of the article that has a surface comprising at least one concavity can be manufactured according to the following processes: (a) providing a mold having a mold surface; (b) applying hardenable fluid onto at least a portion of the mold surface; (c) deliberately introducing at least one gas bubble between the mold surface and the hardenable fluid; and (d) hardening the hardenable fluid to form an article having the at least one concavity on the surface thereof and imparted thereto by the gas bubble. The article is typically removed from the mold.

This method can be used to form a single concavity on the surface of the article or a plurality of concavities on the surface of the article. If multiple concavities are formed, these multiple concavities can be positioned in any manner on the surface of the article. In some examples where multiple concavities are formed, the multiple concavities are arranged in a pattern.

An article that has a surface comprising an arranged pattern of concavities can be manufactured according to the following processes: (a) providing a mold having a mold surface; (b) applying hardenable fluid onto at least a portion of the mold surface; (c) providing gas bubbles at multiple, separate positions between the mold surface and the hardenable fluid, wherein the separate positions are selected based on the arranged pattern; and (d) hardening the hardenable fluid to form an article having the arranged pattern of concavities on the surface thereof and imparted thereto by the gas bubbles. The article is typically removed from the mold.

The "mold surface" is the actual surface of the mold. When a gas bubble is introduced between the mold surface and the hardenable fluid, the hardenable fluid is in direct contact with the actual surface of the mold in at least one location and with a gas bubble in at least one other location. The combination of the actual mold surface and the surface of at least gas bubble provide a molding surface. That is, as used herein, the term "molding surface" refers to the surface that is in direct contact with the hardenable fluid. The shape of the molding surface (specifically, the inverted shape of the molding surface) can be imparted to a surface of an article formed when the hardenable fluid is hardened. A concavity on the surface of the article corresponds to a position where the hardenable fluid is in contact with a gas bubble during the hardening process. Thus, the shape and size of the portion of the gas bubble in contact with the hardenable fluid can be imparted to the hardened article to provide one or more concavities.

Any suitable organic material, inorganic material, or organic-inorganic composite material can be used as a material for the mold. Some exemplary materials for the mold include a resin (e.g., a polymeric resin), a metal, a glass, a ceramic, or a clay. The mold can be composed of one or more pieces. For example, a mold having multiple pieces can be composed of a first layer having at least one opening and a second layer that is laminated to the first layer.

The mold typically has depressions. These depressions can correspond to the opening or the pattern of openings of the first layer of a mold having multiple pieces or can be part of a mold that is a single piece. The depressions are often used to provide the at least one gas bubble that is part of the molding surface. For example, the at least one gas bubble can be entrapped within the depression when the hardenable fluid is applied to a portion of the mold surface.

When depressions of a mold are used to entrap the at least one gas bubble, the article that has a surface comprising at least one concavity can be manufactured according to the following processes: (a) providing a mold having a mold surface with a depression; (b) applying a hardenable fluid onto at least a portion of the mold surface; (c) entrapping a gas bubble between the mold surface and the hardenable fluid in the depression; (d) hardening the hardenable fluid to form an article having a concavity on the surface thereof and imparted thereto by the gas bubble in the depression. The article is typically removed from the mold.

When the mold has a plurality of depressions that can be used to entrap the gas bubbles, the depressions can be arranged in a pattern. An article having an arranged pattern of concavities can be manufactures according to the following processes: (a) providing a mold having a mold surface with multiple depressions arranged in a pattern; (b) applying a hardenable fluid onto at least a portion of the mold surface; (c) entrapping multiple gas bubbles between the mold surface and the hardenable fluid in the multiple depressions; and (d) hardening the hardenable fluid to form an article having an arranged pattern of concavities on the surface thereof and imparted thereto by the multiple gas bubbles in the multiple depressions. The article is typically removed from the mold.

The "hardenable fluid" is a fluid that has enough fluidity to be applied to a mold, and that can be hardened without regard to the hardening method. Suitable hardenable fluids include, for example, an organic material, an inorganic material, or an organic-inorganic composite material that is in the form of a gel, paste, or liquid. Other suitable hardenable fluids include a solution, dispersion, suspension, or the like obtained by diluting an organic material, an inorganic material, or an organic-inorganic composite material with a suitable solvent (i.e., an organic solvent or an aqueous-based solvent). Herein, "hardening" refers to the process of making the hardenable fluid hard enough to retain the shape imparted by the molding surface. More specifically, the hardenable fluid becomes hard enough to retain the shape imparted by the at least one gas bubble that is part of the molding surface; the resulting "hardened layer" has at least one concavity. The hardened layer is the product formed upon hardening of the hardenable fluid.

When an organic material is included in the hardenable fluid, a resin material or the precursor of a resin material can be used. The hardenable fluid can, for example, include monomers or polymers that are polymerized, cured, or crosslinked when hardened. As the "hardening method", any suitable method can be used including, but not limited to, polymerization of a polymerizable resin, cooling a thermoplastic resin to at least a softening temperature, or drying a solvent. Exemplary resin materials include, but are not limited to, a reactive resin such as photo-curable resin that can be hardened by polymerization when irradiated with radiation (e.g., ultraviolet rays, visible light, or electron beam), a thermoset resin that is hardened by heat-oriented polymerization, a reactive resin that can be hardened by oxidization-oriented polymerization, a reactive resin that can be hardened by reduction-oriented polymerization, or a thermoplastic resin that can be hardened when cooled to at least a softening temperature, or the like.

In some applications, a soluble resin can be used as the hardenable fluid. Suitable soluble resins include a water-soluble resin dissolved in water, an organic solvent-soluble resin dissolved in an organic solvent, or the like. If these soluble resins are used as a mold to form a second article, they can often be removed from the second article by dissolution.

When an inorganic material is used as a hardenable fluid, various inorganic materials can be used such as a glass, concrete, plaster, cement, mortar, ceramics, clay, and metal. These materials can often be hardened by heating or removing water. It is also possible to use an organic-inorganic composite material, which can be a composite of any of the above mentioned organic materials and inorganic materials, as the hardenable fluid.

The step of applying a hardenable fluid onto at least a portion of the mold surface can be achieved by any known method. In some methods of applying the hardenable fluid, a mold having depressions is used and the hardenable fluid is applied so that the depressions are not filled or are only partially filled. Some suitable application methods include coating, spraying, injecting, brushing, or pouring the hardenable fluid onto at least a portion of the mold surface. Coating can include, for example, adding the hardenable fluid to a surface and spreading the hardenable fluid over at least a portion of that surface. In many examples, the application method includes coating and any suitable coating method can be used. In some coating methods, the hardenable fluid is applied using a knife coating method. An optimal application method can be selected based on the type of hardenable fluid, the desired shape of an article, the desired size of the article, and so forth.

The hardenable fluid can be applied onto the mold surface before the gas bubble is provided or at the same time the gas bubble is provided. In many embodiments, the at least one gas bubble is present while applying the hardenable fluid to the mold surface. For example, the gas bubble can be present in a depression on the mold. The gas bubble can be entrapped within the depression during the application of the hardenable fluid to the mold surface. The size, shape, and position of the gas bubble provided often can be selected and varied. For example, if the gas bubbles are provided using depressions in a mold, the size, shape, and locations of these depressions can be varied.

The hardenable fluid is in contact with the molding surface. That is, the hardenable fluid is in contact with at least one gas bubble in at least one position and in contact with the mold surface in at least one other position. When the hardenable fluid is hardened, the at least one concavity is formed in the portion of the hardened layer that was in contact with the at least one gas bubble that is part of the molding surface. When a hardenable fluid is hardened, the position of the at least one gas bubble can be controlled to be located at a predetermined position between the mold surface and the hardenable fluid. For example, the gas bubble can be confined within a depression of the mold. The size and the shape of the depression can influence the size and shape of the gas bubble as well as the size and shape of the resulting concavity in the hardened layer. The size and shape of the depression can be varied to provide concavities of different sizes and shapes. Multiple gas bubbles can be provided, for example, by using a mold that contains multiple depressions. If multiple gas bubbles are provided, the size and shape of each gas bubble can be the same or different.

The above mentioned processes to manufacture an article can be carried out in the air. In this embodiment, an article having at least one concavity or an arranged pattern of concavities can be manufactured with a simple device configuration that does not require special devices such as an environmental chamber. The at least one gas bubble can be provided, for example, by entrapment within at least one depression of a mold.

A gas bubble often tends to form a spherical surface based on the balance of all the forces that can affect its shape. These forces include a summation of the interface energy between the gas bubble and the hardenable fluid, the interface energy between the mold surface and the hardenable fluid, and the interface energy between the mold surface and the gas bubble. In addition to these forces, other process variables in the vicinity of the region where the gas bubble contacts the hardenable fluid such as, for example, buoyancy, gravity, and viscosity of the hardenable fluid can influence the shape of the gas bubble. When an approximately uniform force is applied to the surface of the gas bubble or when approximately symmetrical forces are applied to the top of the gas bubble, the gas bubble does not deform and has a relatively uniform and smooth convex surface. This shape is often a substantially spherical convex surface adaptable to a lens or the like. The outer shape of the gas bubble having a substantially spherical surface can be inversely transferred from the molding surface to the article prepared by hardening the hardenable fluid. Therefore, the concavity imparted by the portion of the gas bubble that contacts the hardenable fluid can comprise a concavity at least partially having a substantially spherical surface.

As used herein, the term "spherical surface" means that the surface can be considered to be a portion of a sphere or the surface has a spherical curvature. Some spherical surfaces can be considered to be dome-shaped or hemispherical. Other spherical surfaces can cover a smaller or larger portion of a sphere than a hemisphere. As used herein, the term "substantially spherical surface" means that the surface can generally be considered to be a portion of a sphere but may differ slightly from being a perfectly spherical surface. All the substantially spherical surfaces can have the same or different curvature and can include a mixture of spherical surfaces whose curvatures continuously change depending on the position.

Some concave surfaces are an asymmetrical surface rather than a symmetrical spherical surface. A concave surface with an asymmetrical shape can be imparted to an article using the outer surface of a gas bubble having an asymmetrical shape. The asymmetrically shaped gas bubble can be formed by applying non-uniform forces to the convex surface of the gas bubble or by applying a force that has an asymmetrical distribution to the top of the convex surface of the gas bubble.

The articles having at least one concavity can be manufactured using a relatively simple process. A single concavity can be formed on the surface of the article or a plurality of concavities can be formed that can be arranged randomly or in a pattern. The at least one concavity can be spherical or substantially spherical and can be used as a lens. An article having an arranged pattern of concavities such as microconcavities can be manufactured in a simple process that is less time consuming and less costly than other known process for making similar articles. Further, it is possible to modify the manufacturing process so that it can be performed in continuous manner and so that any desired size article can be prepared.

According to one embodiment of the present invention, the mold can comprise at least one depression, and the at least one gas bubble is deliberately introduced at the molding surface by entrapping it in the at least one depression of the mold while applying the hardenable fluid to the mold surface. That is, the gas bubble is entrapped in the depression of the mold and is positioned between the mold surface and the hardenable fluid. The molding surface in contact with the hardenable fluid includes a combination of the mold surface (i.e., the actual mold surface) and at least one gas bubble.

For example, the mold can comprise an arranged pattern of multiple depressions and a plurality of gas bubbles can be deliberately introduced at the molding surface by entrapping them in the arranged pattern of multiple depressions of the mold while applying the hardenable fluid to the molding surface. That is, multiple gas bubbles can be entrapped in the plurality of depressions of the mold that are arranged in a pattern. Each of the multiple gas bubbles can be entrapped within a depression of the mold between the mold surface and the hardenable fluid. The molding surface in contact with the hardenable fluid includes a combination of the mold surface (i.e., the actual mold surface) and multiple gas bubbles arranged in a pattern.

In these embodiments, since at least one depression or an arranged pattern of depressions are provided in the mold beforehand, gas bubbles can be entrapped in the at least one depression of the mold while applying the hardenable fluid to the molding surface. The location of the at least one depression corresponds to the position of the at least one gas bubble that is part of the molding surface. The position of the at least one gas bubble corresponds to the location of the concavities imparted to the articles prepared by hardening the hardenable fluid in contact with the molding surface. Therefore, the at least one concavity can be located at a predetermined position on the article certainly and easily. In addition, because the locations of the depressions correspond to the positions where the concavities are formed in the article, multiple concavities having a high positional accuracy can be formed on the article.

The volume of a depression in the mold influences the amount of gas than can be entrapped within the depression between the hardenable fluid and the mold surface. If there are multiple depressions, the volumes of multiple depressions can be similar or any portion of the multiple depressions can be similar. The size of any concavity can be varied by varying the volume of the depression that entraps that gas bubble that results in that particular concavity. For example, a first group of concavities can have a first size that is different from a second group of concavities that have a second size.

Any desired pattern of depressions can be included in the mold. For example, the arranged pattern of depressions can include an arranged row pattern, an arranged lattice pattern such as a square lattice pattern (i.e., a lattice pattern is a pattern with multiple rows, multiple columns, or both), an arranged zigzag pattern, or an arranged radial pattern. The depressions within the pattern can be the same size and shape or can be different.

According to the above mentioned embodiments, a gas bubble can be provided between the mold surface and the hardenable fluid by entrapping it in the depression of the mold while applying the hardenable fluid to at least a portion of the mold surface. For example, a portion of the total gas (e.g., air) existing around the mold can be entrapped within a space between the hardenable fluid and the mold surface while the hardenable fluid is applied to the mold by coating or injection. An entrapped gas bubble can become part of the molding surface and can impart a concavity to the hardened layer. In this case, if a coating is applied, various coating devices, such as, for example, a knife coater, a bar coater, a blade coater, and a roll coater, can be used.

Entrapping the at least one gas bubble can be controlled by adjusting factors such as, for example, the viscosity of hardenable fluid, the coating speed, various interfacial tension relationships among the hardenable fluid, the gas and the mold, or the like. Conditions of the entrapped bubble of the gas such as size, shape and position can also be controlled by the similar factors for entrapping the bubble of the gas mentioned above such as, for example, the size, shape, and position of the depressions in the mold. The entire process can be conducted under atmospheric pressure and no evacuation is needed.

Another aspect of the present invention is an article having a surface comprising at least one concavity such as an arranged pattern of concavities manufactured according the above mentioned manufacturing method. During manufacture, one or more gas bubbles impart the at least one concavity such as the arranged pattern of concavities to the surface of the article.

In one embodiment of the article, at least one smooth concave surface can be formed using a molding surface that includes at least one gas bubble. If multiple concavities are formed, these multiple concavities can be arranged randomly or in a pattern. An arranged pattern of concavities can be formed using a molding surface that includes an arranged pattern of gas bubbles. This arranged pattern of gas bubbles often corresponds to an arranged pattern of depressions in the mold. Each smooth concave surface produced is the inverse of a portion of the outer surface of a gas bubble that is part of the molding surface. In many examples, the gas bubble has a substantially spherical surface and the resulting concavity imparted to the article has a substantially spherical surface.

If multiple concavities are arranged in a pattern on the surface of the article, the pattern can be of any design. For example, the arranged pattern can be an arranged row pattern, an arranged lattice pattern, an arranged zigzag pattern or an arranged radial pattern. The concavities can all be of a similar size and shape or any portion of the concavities can be of a similar size and shape. In some articles having an arranged pattern of concavities, some or all of the concavities has a substantially spherical surface.

Additionally, a concavity having an overhang shape (e.g., see 32a in FIG. 3A), which is difficult to form using conventional mechanical machining, can be formed on the surface of the article.

The articles described herein can be used in various fields and applications. Especially, if the at least one concavity on the surface of the article is substantially transparent or translucent to visible light and has a substantially spherical surface, the article can be used in various optical applications. For example, the concavity can function as a lens such as a microlens. An arrangement of multiple concavities that are transparent or translucent to visible light and that have substantially spherical surfaces can be used as an array of lenses such as a microlens array.

A first article having a surface comprising at least one concavity such as an arranged pattern of concavities can be used as a mold (i.e., a second mold) to produce a second article having at least one convexity such as an arranged pattern of convexities on its surface. The at least one convexity on the second articles is the inverse of the at least one concavity present on the first article that is used as the second mold. That is, any concavity present in the first article can be imparted to the second article as a convexity.

The term "at least one convexity" refers to a single convex surface or to multiple convex surfaces. The at least one convex surface can be imparted to the article using a mold with at least one concave surface. An "arranged pattern of convexities" is a pattern of a plurality of convexities arranged at predetermined positions, arranged with some degree of regularity, or arranged in any desired manner. For example, the arranged pattern of convexities can include an arranged row pattern, an arranged lattice pattern such as an arranged square lattice pattern, an arranged zigzag pattern, or an arranged radial pattern. The arranged pattern of convexities need not be formed evenly on the entire article, but may be formed in only a portion of the article. The pattern of convexities may vary or remain the same over any portion of the article. For example, similar or different patterns can be used within the same plane. The convexities within the pattern can be of the same size and shape or can have different sizes and shapes.

By virtue of using the first article as a second mold to form the second article, the second article that has at least one convexity such as arranged pattern of convexities can be formed using relatively simple processes and relatively short manufacturing times compared to other conventional methods of forming similar articles. More specifically, a second article having at least one substantially spherical convex surface such as an arranged pattern of convex surfaces can be formed using a first article that has at least one substantially spherical concave surface. The at least one convex surface formed in the second article can be, for example, a microconvexity.

Thus, another aspect of the present invention is a second article that has a surface comprising at least one convexity such as an arranged pattern of convexities. The method comprises using the first article made by the above mentioned manufacturing method as a second mold to impart the at least one convexity such as an arranged pattern of convexities to the surface of the second article.

The second article can be manufactured by applying a second hardenable fluid to the first article using an application method such as coating or injection. The second hardenable fluid is applied to the surface of the first article that contains at least one concavity. Suitable second hardenable fluids are often the same types of hardenable fluids described above that can be used to prepare the first article with at least one concavity. The second hardenable fluid is typically selected to be compatible with the first article that is used as the second mold. More specifically, the second hardenable fluid it often selected so that it does not dissolve or alter the shape and dimensions of the second mold. The second hardenable fluid can include an organic material, inorganic material, or organic-inorganic composite material that is in the form of a gel, paste, liquid, dispersion, suspension, or the like. After the hardenable fluid has been applied to the second mold but prior to hardening, a deaeration process can be added to remove entrapped gas bubbles such as entrapped gas bubbles between the surface of the second mold and the second hardenable fluid. In some instances, the presence of entrapped gas bubbles can cause defects in the second article.

In some examples, the at least one convexity has a substantially spherical surface and the process involves the use of a second mold that has at least one concavity with a substantially spherical surface. The at least one concavity in the second mold often has a diameter less than 1000 micrometers, less than 100 micrometers, or less than 10 micrometers. The at least one convexity formed in the second article has a diameter comparable to the diameter of the at least one concavity present in the second mold. The second mold is prepared using at least one gas bubble such as an arranged pattern of gas bubbles in a molding surface that imparts at least one concavity such as an arranged pattern of concavities to the surface of the second mold.

In some exemplary second articles, the at least one convexity has a substantially spherical surface. If this at least one convexity is substantially transparent or translucent in the visible region, the second article can be used in various optical fields. More specifically, the at least one convexity can be used as a lens such as a microlens and an arranged pattern of convexities can be used as an array of lenses such as a microlens array.

If there are more than one convexity on the surface of the second article, all or any portion of the convexities can be similar. For example, there can be a first group of convexities having substantial similarity and a second group of convexities having substantial similarity but that are different from the first group of convexities.

A surface of the second article can be covered with the first article that serves as the second mold. In this case, the second article is not removed from the first article during the manufacturing processes. Such a combined article composed of both the first article and the second article can be used in various fields. For example, when materials with different refractive indexes are used to prepare the first article and the second article, the combined article can function as a lens even if the combined article has a flat surface.

Figure 1B:
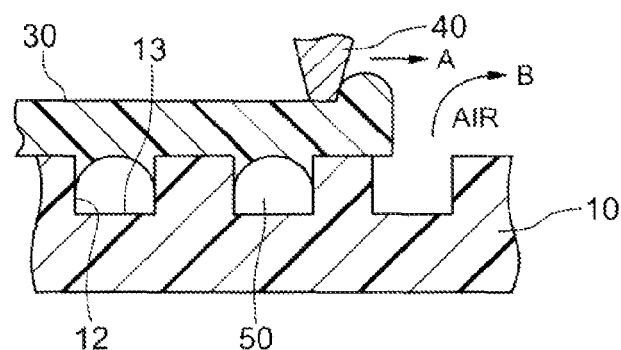
Figure 1C:
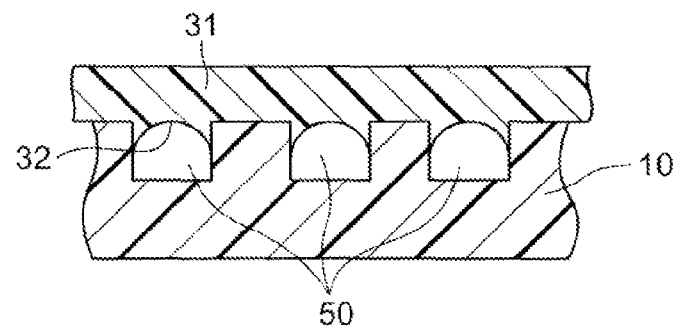
Figure 1D:
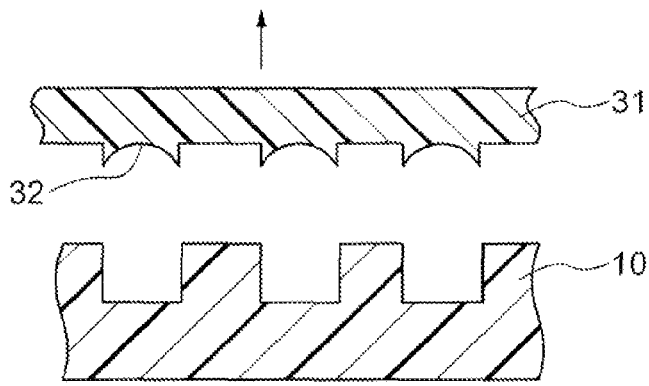
Figure 1E:
FIGS. 1E to 1G are schematic sectional view exemplifying one embodiment of a method of manufacturing a second article having at least one convexity.
Figure 1F:
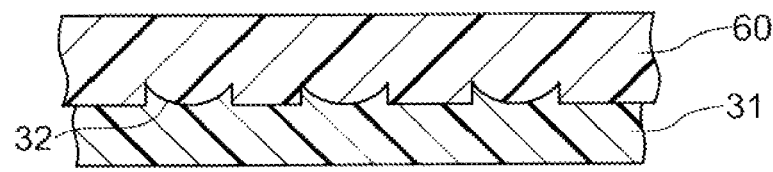
Figure 1G:
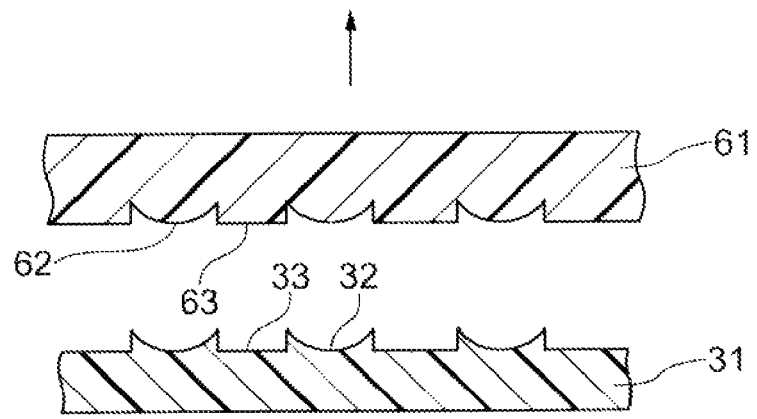

One exemplary process for preparing a first article having at least one concavity and a second article having at least one convexity is schematically illustrated in FIGS. 1A to 1G. More specifically, FIGS. 1A to 1D schematically illustrate one embodiment of a manufacturing method for making an article having a surface comprising multiple concavities such as an arranged pattern of concavities. FIGS. 1E to 1G schematically illustrate one embodiment of a manufacturing method for making a second article having a surface comprising multiple convexities such as an arranged pattern of convexities.

FIGS. 1A to 1D schematically illustrate one exemplary manufacturing process that can be used to manufacture the article 31 having a plurality of concave surfaces 32. FIG. 1A illustrates the step of providing a mold 10 that has a plurality of depressions 11. FIG. 1B illustrates the step of applying a hardenable fluid to the mold 10 and providing gas bubbles 50. The gas bubbles 50 are entrapped in the depressions 11 and are positioned between the mold surface 12, 13 and the hardenable fluid 30. FIG. 1C illustrates hardening the hardenable fluid 30 to form the article 31 having the arranged pattern of concavities 32 on a surface thereof and imparted thereto by the gas bubbles 50. FIG. 1D illustrates removing the article 31 from the mold 10. The article 31 is shown with three concavities 32 but any desired number of concavities can be formed. The concave surfaces 32 are formed at locations corresponding to the depressions 11 in the mold and to the locations of the entrapped gas bubbles 50. The outer shape of the gas bubbles 50 are imparted to the article 31 resulting in the concavities 32. Each of the manufacturing processes in FIG. 1A to 1D can be carried out while the mold 10 is under ambient conditions. The molding process used to manufacture article 31 does not need to be placed in a special environmental chamber.

The gas bubbles 50 are entrapped while applying the hardenable fluid 30 to the mold surface with a coating device 40. In many embodiments, the hardenable fluid 30 comprises a hardenable resin. The hardenable fluid 30 preferably is applied over the depressions in the mold in such a manner that the multiple depressions are not filled with the hardenable fluid 30. That is, the hardenable fluid 30 preferably does not contact mold surface 13. The gas bubbles 50, however, contact mold surfaces 12 and 13 as well as a portion of the hardenable fluid 30 positioned over depression 11. The molding surface is the surface in contact with the hardenable fluid 30 and includes both the outer surface of the gas bubbles 50 in direct contact with the of the hardenable fluid 30 and any portion of the mold surface in direct contact with the hardenable fluid 30. For example, the portion of the mold between the depressions 11 is in direct contact with the hardenable fluid 30. After applying the hardenable fluid 30 and entrapping the gas bubbles 50, the hardenable fluid 30 is hardened and removed from the mold 10. The resulting article 31 has a plurality of concave surfaces 32 to which a portion of the outer shapes of the gas bubbles 50 are imparted.

If the mold contains multiple depressions 11, these multiple depressions can be arranged randomly or arranged in any desired pattern. In some embodiments, a plurality of depressions 11 can be arranged in a single row or in a lattice pattern. As used herein, a mold having a lattice pattern of depressions means that there are at least two rows, at least two columns, or at least two rows and at least two columns of depressions 11 in the mold. For example, some lattice patterns are square lattice patterns where the number of rows is equal to the number of columns. In other embodiments, the depressions can be arranged in a pattern such as a zigzag pattern or a radial pattern.

In the process shown in FIG. 1A, the mold 10 having a plurality of depressions 11 is provided. The plurality of depressions 11 can be arranged randomly or arranged in any desired pattern based on the use of the resulting articles. The location of the depressions 11 determines the positions of the entrapped gas bubbles 50 that impart the at least one concavity to the surface of the articles. The location of the concavities 32 on the surface of the article 31 can be selected by the arrangement of the depressions 11 on the mold 10.

Any suitable material can be used to prepare the mold 10. In some exemplary methods, an organic resin material such as polypropyrene, polyethylene, polystyrene, or poly-cyclo-olefin can be used for the mold 10. In other exemplary methods, other suitable organic materials, inorganic materials such as metals (e.g., nickel, copper, or brass), glasses or ceramic materials, or organic-inorganic composite materials can be used. The mold 10 can be flexible or hard. A flexible mold 10 often can be more easily handled. However, a mold 10 made of hard material such as a metal or a crystallized polymer often can provide improved dimensional accuracy. The mold 10 can be any suitable size but the size is often selected based on the dimensions of the coating device 40. Some exemplary molds 10 have a vertical dimension in the range of 1 to several thousand millimeters, a horizontal dimension in the range of 1 to several thousand millimeters, and a thickness dimension in the range of 10 micrometers to greater than 10 millimeters.

The depression 11 can have any suitable shape. The planar shape observed from above the depression 11 can be, for example, a circle, triangle, square, rectangle, ellipsoid, trapezoid, pentagon, hexagon or cross. For example, the depression 11 can have a square or rectangular cross section as shown in FIG. 1A. In this case, a side surface 12 and a bottom surface 13 of the depressions may be configured with linear shapes or with curved shapes. The relationship between the shape of the depression 11 and the shape of the gas bubble 50 will be described in detail later.

Figure 2A:
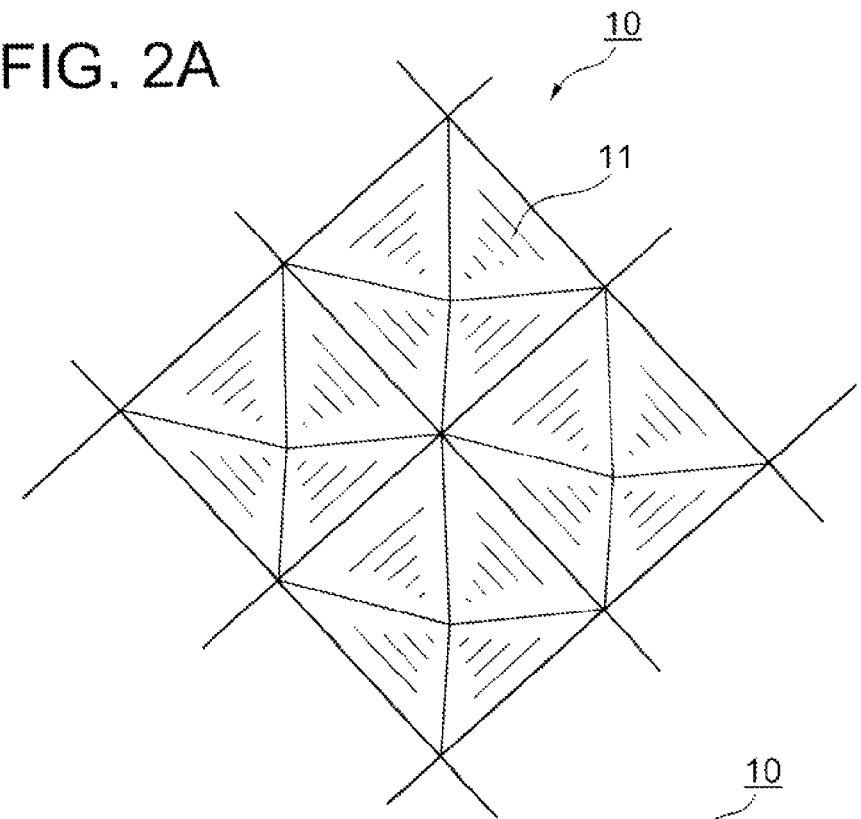
FIG. 2A is a schematic view exemplifying one embodiment of a mold having multiple depressions.
Figure 2B:
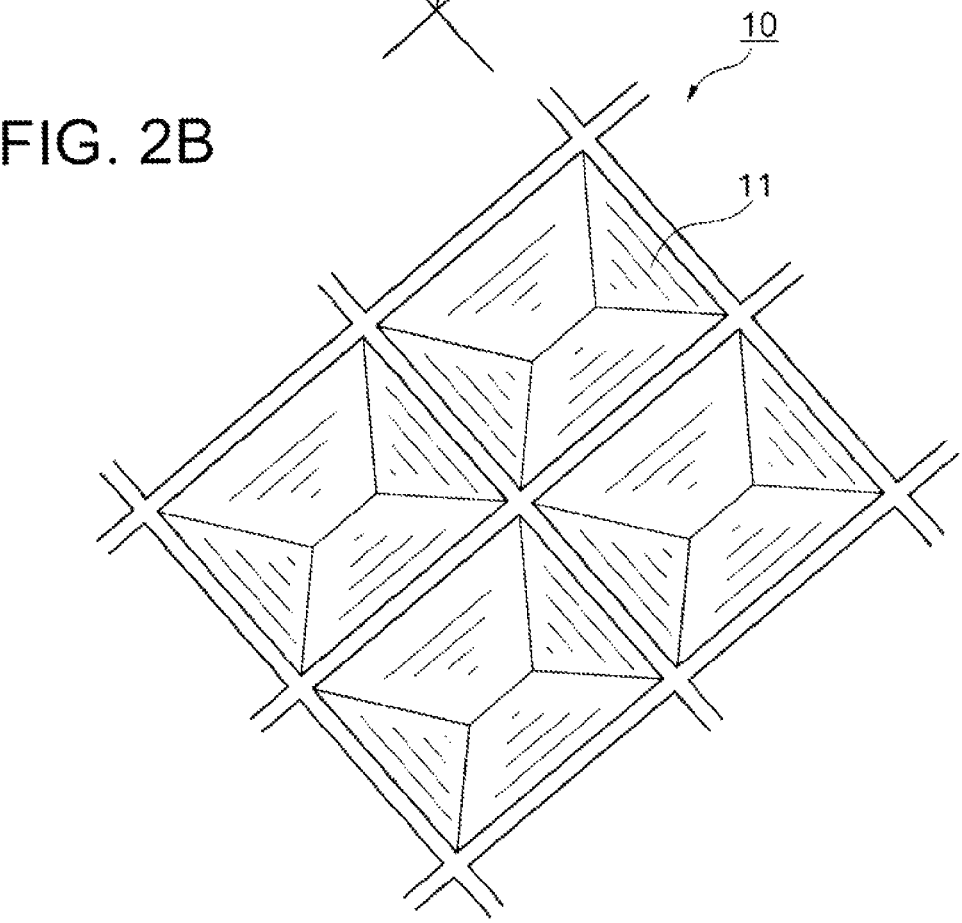
FIG. 2B is a schematic view exemplifying another embodiment of a mold having multiple depressions.

FIG. 2A is a schematic view observed from above showing another exemplary mold 10 having multiple quadrangular pyramid depressions 11 with rectangular planar shaped sides. Each of the pyramids in FIG. 2A has a pointed bottom. FIG. 2B is a schematic view observed from above showing yet another exemplary mold 10 having multiple quadrangular pyramid depressions 11 with triangular planar shaped sides. Each of the pyramids in FIG. 2B has an edge line at the bottom.

In other examples, depression 11 can have a triangular cross section and this cross-sectional shape becomes narrower from the top side toward the bottom side. A side surface may be configured with a linear shape or with a curved shape. A bottom portion of the depression 11, which is a part of the mold surface, may be configured, for example, with a flat shape as shown in FIG. 1A, a pointed shape, a linear shape, or a rounded shape. In still other examples, depressions 11 can have a trapezoidal cross sectional shape and the cross-sectional width may become narrower from the top towards the bottom or may become wider from the top towards the bottom. The side surfaces and the bottom surface may be configured with linear shapes or with curved shapes. Any other suitable shapes for the depressions 11 can be used.

The depressions 11 can have any suitable dimensions. As examples of the size of the depression 11, the depth can be 0.1 μm or more, 1 μm or more, or 10 μm or more. The depth can often be 100 mm or less, 10 mm or less, or 1 mm or less. The cross-sectional area of the depression opening can be 0.01 μm$^2$ or more, 0.1 μm$^2$ or more, or 1 μm$^2$ or more. The cross-sectional area can often be 1000 mm$^2$ or less, 100 mm$^2$ or less, or 10 mm$^2$ or less. The dimensions are not limited, however, to these values.

In the process shown in FIG. 1B, the coating device 40 is set adjacent to the mold 10. The coating composition is coated on at least a portion of the mold 10 with the coating device 40 to form the hardenable fluid layer 30. The hardenable fluid layer 30 does not fill the depressions 11. That is, the hardenable fluid 30 does not contact the mold surface 13. At the same time, gas bubbles 50 are provided in the depression 11 of the mold 10. The coating process can be performed in the air under normal atmospheric conditions.

In some embodiments of the coating process shown in FIG. 1B, the hardenable fluid includes a hardenable polymeric resin. Any suitable polymeric resin can be used alone or in combination with other polymeric resins. For example, the hardenable fluid can be a solution of a polymer resin such as a photo-curable resin (e.g., a UV curable resin) or a soluble resin (e.g., a water or organic solvent soluble resin). If the mold 10 has a sufficient heat resistance, the polymer resin can be a thermoplastic resin or a thermoset resin. Any of the polymeric resins can contain various additives, such as a thickener, a curing agent, a crosslinking agent, an initiator, an oxidant inhibitor, an antistatic agent, a diluent, a detergent, a pigment, or a dye.

Exemplary photo-curable resins include, but are not limited to, a photopolymerizable monomer, oligomer, or mixture thereof. Photopolymerizable monomers include acrylate based monomers, methacrylate based monomers, and epoxy based monomers. Photopolymerizable oligomers include acrylate based oligomers, methacrylate based oligomers, urethane acrylate based oligomers, epoxy based oligomers, epoxy acrylate based oligomers, and ester acrylate based oligomers. A photoinitiator is usually added to the photo-curable resins. When a UV curable resin is used, the resin can usually be hardened quickly using ultraviolet radiation without exposing the mold or the like to a high temperature.

Exemplary thermoset resins that can be included in the hardenable fluid include, but are not limited to, acrylate based resins, methacrylate based resins, epoxy based resins, phenol based resins, melamine based resins, urea based resins, unsaturated ester based resins, alkyd based resins, urethane based resins, or ebonite based resins. A polymerization initiator is typically added to the thermoset resin. The resulting cured polymeric material can have good heat and solvent resistance. Additionally, if fillers are added, the resulting cured polymeric material can be quite strong.

Exemplary thermoplastic resins that can be included in the hardenable fluid include, but are not limited to, polyolefin resins, polystyrene resins, polyvinyl chloride resins, polyamide resins, or polyester resins.

Exemplary soluble resins that can be included in the hardenable fluid include, but are not limited to, water-soluble resins and organic solvent-soluble resins. Suitable water-soluble resins include, for example, polyvinyl alcohols, polyacrylic acids, polyacrylic amides, and polyethylene oxides.

Any suitable hardening method can be used. The hardening method is typically selected based on the composition of the hardenable fluid. Some hardening methods include a drying process to remove water or an organic solvent. Other hardening methods include exposing the hardenable fluid to actinic radiation such as UV radiation. Still other hardening methods include exposing the hardenable fluid to heat or cooling the hardenable fluid.

Any suitable coating device 40 can be used to apply the hardenable fluid layer 30 to at least a portion of the mold 10. In some embodiments, the coating device 40 is a knife coater. For example, when a thermoplastic resin is used as the hardenable fluid resin, a heated knife coater that is heated to a temperature at which the resin has a sufficient fluidity can be used. In other embodiments, the coating device 40 can be a bar coater, a blade coater, or a roll coater.

To apply the hardenable fluid layer 30 to at least a portion of the mold 10, either the coating device 40 or the mold can be moved. In some examples, the mold is stationary and the coating device is moved adjacent to the mold 10. In other examples, the coating device 40 can be stationary and the mold 10 can be provided from a roll that is passed by the coating device 40. In these examples, a continuous manufacturing line can be designed to form articles having at least one concavity.

Referring to FIG. 1B, as the coating device 40 moves in the direction of an arrow A (from left to right), the hardenable fluid layer 30 is coated on the mold 10. Although FIG. 1B illustrates the application of the hardenable fluid layer 30 to the mold 10 by coating, other application methods such as, for example, injection can be used as long as the other application methods can entrap gas bubbles 50.

The average thickness of the hardenable fluid layer 30 can be any desired thickness and can be varied according to the article desired. In some examples, the average thickness of the hardenable fluid layer 30 is about 10 µm to 100 mm or 10 µm to 10 mm. As the hardenable fluid layer 30 is applied to the mold 10, a part of the air existing around the mold 10 can be pushed out from the space around the mold 10 as indicated by an arrow B and another part of the air can be entrapped in the depressions 11. Air that is entrapped in the depression 11 can contact mold surface 12 and 13 of the depression 11 as a gas bubble 50.

The entrapment of gas bubbles 50 within the depressions 11 can be controlled, for example, by adjusting factors such as the viscosity of hardenable fluid 30, the coating speed, and the interfacial tension relationships among the hardenable fluid 30, the gas bubble 50, and the mold 10. For example, if the coating speed is faster than the natural flow rate of the hardenable fluid on a surface of the depression of the mold, a bubble of the gas can be entrapped within each depression of the mold. The natural flow rate means the flow rate of the hardenable fluid when it is placed on the mold and may be affected, for example, by the viscosity of hardenable fluid and the interfacial tension relationships among the hardenable fluid, the gas, and the mold. If the viscosity of hardenable fluid is low, gas bubbles 50 can be entrapped by increasing the coating speed or by changing materials of the mold.

The process is a controlled displacement of gas (air) entrapped in the mold 10 and advantageously results in gas bubbles 50 being entrapped in the mold depressions 11 so that they can be used as part of the molding surface. The sizes and positions of the gas bubbles 50 can be controlled by adjusting the process variables including the moving speed of the coating device 40.

Although the gas bubbles 50 are positioned inside the depressions 11 in FIGS. 1B and 1C, they are not limited thereto. That is, the outer surface of the gas bubbles 50 can be outside the depressions 11. For example, the upper portions (i.e., the upper surface) of the gas bubbles 50 may extend beyond from the top surface of the mold 10 as shown in the sectional view of FIG. 4. Although a single gas bubble 50 can exist in a single depression 11 as shown in FIGS. 1B and 1C, more than one gas bubble may exist within a single depression 11.

In the process shown in FIG. 1C, the hardenable fluid layer 30 is hardened to form the hardened layer 31. Any suitable hardening method can be used that is compatible with the hardening fluid 30. For example, when the hardenable fluid is a UV curable resin, the hardened layer 31 can be formed by irradiating the hardenable fluid layer 30 with a UV light source to polymerize the resin. When the hardenable fluid layer contains a soluble resin, the hardened layer 31 can be formed by drying to remove the solvent. When the hardenable fluid is a thermoplastic resin, the hardened layer 31 can be formed by cooling the thermoplastic resin to at least the softening temperature. When the hardenable fluid is a thermoset resin, the hardened coating 31 can be formed by heating the thermoset resin to at least the curing temperature.

The hardened layer 31 as shown in FIG. 1C has a plurality of concave surfaces 32 that result from contacting the outer surface of the gas bubbles 50 during hardening. That is, the outer shapes of the gas bubbles 50, which can have a substantially spherical surface, are inversely transferred to the hardened layer 31. That is, the outer shapes of the gas bubbles 50 are part of the molding surface in contact with the hardenable fluid 30. The hardened layer 31 has the inverse shape of the molding surface.

The gas bubbles 50 are part of the molding surface, which is the operational surface in contact with the hardenable fluid 30. Because the gas bubbles 50 are part of the molding surface and the gas bubbles 50 often have substantially spherical convex outer surfaces, the hardened layer 31 often has substantially spherical concave surfaces. The concavities formed in the hardened layer 31 can be micro-concavities.

In the process shown in FIG. 1D, an article (i.e., hardened layer) 31 having a plurality of concave surfaces 32 such as a plurality of micro-concavities can be obtained by removing or separating the hardened layer 31 from the mold 10. In some embodiments, the mold 10 can be used to form other hardened layers 31. The article 31 having at least one concavity can be used as an optical article such as a lens or array of lenses or can be used to prepare a second article that has at least one convexity.

In some embodiments of the article 31, a first surface of the article has multiple concavities and a second surface opposite the first surface is flat. The flat surface can have a matte or glossy finish. The surface roughness of either surface can be, for example, less than 100 nanometers, less than 50 nanometers, less than 10 nanometers, or less than 5 nanometers. The surface roughness can be measured using a profilometer such as a Surface Profiler System P-16 from KLA-Tencor Corporation.

The process shown in FIGS. 1A to 1D can be performed in a continuous manner to provide articles 31 having at least one concavity such as an arranged pattern of concavities. Any pattern of concavities can be imparted to the article from a molding surface in contact with the hardenable fluid 30. The molding surface includes at least a portion of at least one gas bubble 50. A concavity in the resulting hardened layer is formed where the outer surface of the at least one gas bubble 50 contacts the hardenable fluid 30.

The article 31, manufactured through the processes of the steps of FIG. 1A to FIG. 1D, has a surface that is the inverse of the molding surface used to form the article. More particularly, the article 31 has concavities that were imparted by portions of the outer surface of gas bubbles 50. Often, the shape of concavity 32 is the inversion of a substantially spherical surface having a curvature determined by the size of the gas bubbles 50. The concavities can have any suitable size depending on the use of the article 31. Some exemplary concavities have a cross-sectional area in the bottom portion that is about 0.01 $\mu m^2$ or more, 0.1 $\mu m^2$ or more, or 1 $\mu m^2$ or more. This cross-sectional area is often 100 $mm^2$ or less, 10 $mm^2$ or less, or 1 $mm^2$ or less. The height of the concavity 32 is often 0.1 $\mu m$ or more, 10 $\mu m$ or more, or 10 $\mu m$ or more. This height can be, for example, 100 mm or less, 10 mm or less, or 1 mm or less.

Figure 3A:
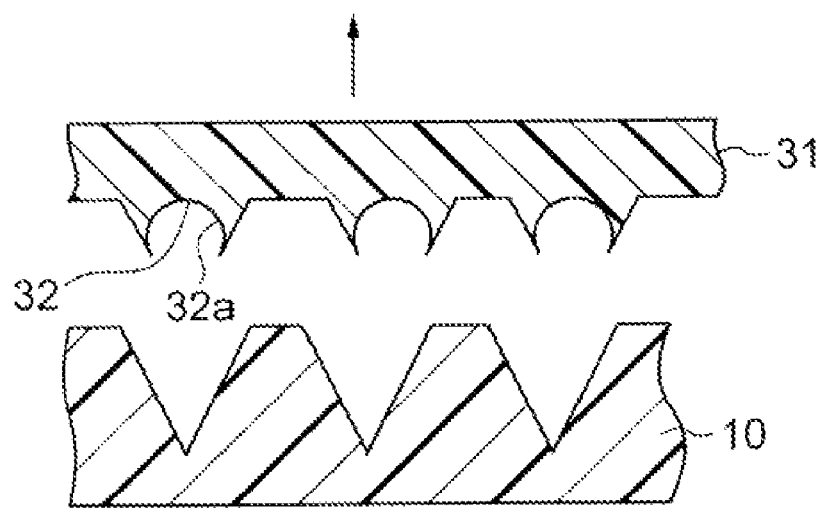
FIG. 3A is a schematic sectional view exemplifying another embodiment of a method of manufacturing a first article having at least one concavity.

FIG. 3A illustrates another manufacturing process corresponding to the process shown in FIG. 1D. FIG. 3A shows a process that can be used to obtain an article 31 having a concave surface 32 with an over-hang portion 32A. Over-hang portions can often be formed using a mold that has depressions with a subulate shape (i.e., depressions having a shape that tapers to a point) such as triangle pyramid, square pyramid, circular cone, or the like. Additionally, the over-hang portion can have a sharp or pointed edge. Articles with concave surfaces that include an over-hang portion can be easily manufactured; these types of structures can be very difficult to form using methods such as mechanical machining or the like.

FIGS. 3A and 1D illustrate how the shape of the depression can be selected to alter the shape of the at least one concavity formed on the surface of the article. In addition to the shape of the depression 11, other variables can be used to alter the shape of the concavities formed when the hardenable fluid 30 is hardened to article 31. That is, the molding surface in contact with the hardenable fluid 30 can be varied by altering the size and shape of the depressions and other process variables.

Since the concave surfaces 32 are formed by entrapping gas bubbles 50 in the respective depressions 11 arranged in the mold 10, a plurality of concave surfaces 32 can have substantially the same shape if the depressions have substantially the same shape. That is, the repeatability of the process of making concave surfaces can be controlled by controlling the entrapped gas bubbles. More particularly, by controlling the size, shape, and position of the entrapped gas bubbles 50, the size, curvature, and position of the concave surfaces 32 can be controlled.

The size (e.g., volume, diameter, or cross-sectional area) of the gas bubbles 50 may be controlled by, for example, (a) adjusting the size and shape of the depressions 11 of the mold 10, (b) adjusting the viscosity of the hardenable fluid 30 that is applied to the mold 10, (c) adjusting the speed of applying the hardenable fluid 30 to the mold 10, (d) adjusting the interfacial tensions among the hardenable fluid 30, the mold 10, and the gas bubbles 50, (e) adjusting the time from coating of the hardenable fluid 30 to the hardening thereof, (f) adjusting the temperature of the gas bubbles 50, and (h) adjusting the pressure to be applied to the gas bubbles 50. The specific size of the gas bubbles 50 adjustable in the above mentioned manner may have, for example, a diameter in the range of 0.1 $\mu m$ to 100 mm. Each adjustment is further described below.

The size and shape of the depressions 11 can be used to adjust the size of the gas bubbles 50. The gas bubbles 50 within the depressions 11 are significantly influenced by the interfacial tension between the gas bubbles 50 and the hardenable fluid 30 in the region where the gas bubbles 50 contact the hardenable fluid 30. In the vicinity of the region where the gas bubbles 50 contact the hardenable fluid, the gas bubbles 50 are also influenced by the interfacial tension between the gas bubbles 50 and the mold surfaces of the depressions 11 and the interfacial tension between the hardenable fluid and the mold surfaces of the depressions 11. The gas bubbles 50 often form smooth substantially spherical convex surfaces in the region where the gas bubbles 50 contact the hardenable fluid, while the curvature and shape of the convex surfaces are influenced by the size and shape of the depressions 11.

The size and configuration of the depressions 11 affect the curvature and shape of the gas bubbles 50 whose curvature and shape are subsequently imparted to the molded articles. While the depressions 11 can take various planar shapes, if the resulting concavities will be used as a lens, it is often preferable that the planar shape of the depressions 11 be a symmetrical shape (point symmetrical or line symmetrical) or a shape similar to symmetrical shape. That is, when the depression 11 is arranged in such a way that the vertex of the convex surface of the gas bubble 50 comes to the center of the approximately symmetrical planar shape, the gas bubble 50 can have a smooth convex surface that has few deformations. As the mold 10 is placed horizontally, buoyancy and gravity can be uniformly applied to the convex surfaces so that the gas bubbles 50 can have substantially spherical convex surfaces.

The viscosity of the hardenable fluid can be adjusted to control the size of the gas bubbles 50. For example, in the process schematically illustrated in FIG. 1B, the size of the entrapped gas bubbles 50 can be controlled by adjusting the viscosity of the hardenable fluid 30 that is applied to the mold 10. Specifically, the size of the gas bubbles 50 can be increased by increasing the viscosity of the hardenable fluid, while the size of the gas bubbles 50 can be decreased by decreasing the viscosity of the hardenable fluid. The viscosity of the hardenable fluid is not limited, but is often 1 mPa-sec or more, 10 mPa-sec or more, or 100 mPa-sec or more. The viscosity of the hardenable fluid can be 100000 mPa-sec or less, 10000 mPa-sec or less, or 1000 mPas or less. The adjustment of the viscosity can be carried out by adjusting the concentration of the hardenable fluid (solvent can be added or removed) or by adding a thickener.

The coating speed can be adjusted to control the size of the gas bubbles 50. In the process schematically illustrated in FIG. 1B, the size of the trapped gas bubbles 50 can be controlled by adjusting the speed of coating the hardenable fluid 30 to the mold 10. If the mold is stationary, the speed of moving the coating device 40 can be adjusted. Alternatively, if the coating device 40 is stationary, the speed of moving the mold can be adjusted. As exemplified in FIG. 1B, the movement of the coating device 40 is indicated by the arrow A. If a knife coater is used as the coating device 40, the coating speed can be defined by the speed of the moving the knife edge. Specifically, the size of the gas bubbles 50 can be increased by increasing the coating speed, while the size of the gas bubbles 50 can be decreased by decreasing the coating speed. Although any suitable coating speed can be used, some exemplary coating speeds are in the range of 0.01 to 1000 centimeters/second, in the range of 0.5 to 100 centimeters/second, in the range of 1 to 50 centimeters/second, or in the range of 1 to 25 centimeters/second.

In the process shown in FIG. 1B, the size of the entrapped gas bubbles 50 can also be controlled by adjusting the interfacial tension between the hardenable fluid 30 and the molding surface of the mold 10, the interfacial tension between the hardenable fluid 30 and the gas bubbles 50, and the interfacial tension between the gas bubbles 50 and the surface of the mold 10. Specifically, for example, the size of the gas bubbles 50 can be increased by increasing the contact angle between the hardenable fluid 30 and the surface of the mold 10 (decreasing the wettability), while the size of the gas bubbles 50 can be decreased by decreasing the contact angle between the hardenable fluid 30 and the surface of the mold 10 (increasing the wettability).

In the processes shown in FIGS. 1B and 1C, the size of the entrapped gas bubbles 50 can be controlled by adjusting the time from coating of the hardenable fluid 30 to hardening thereof. Specifically, the size of the gas bubbles 50 can be increased by shortening the time from coating of the hardenable fluid 30 to hardening thereof, while the size of the gas bubbles 50 can be decreased by lengthening the time from coating of the hardenable fluid 30 to hardening thereof.

In the processes shown in FIGS. 1B and 1C, the size of the entrapped gas bubbles 50 also can be controlled by adjusting the temperature of the gas bubbles after coating the hardenable fluid 30 but before or during hardening of the hardenable fluid 30. Specifically, the size of the gas bubbles 50 can be increased by raising the temperature of the gas bubbles 50, while the size of the bubbles 50 can be decreased by lowering the temperature of the gas bubbles 50. The adjustment of the temperature of the gas bubbles 50 is one of control methods that can change the size of the bubbles 50 after the gas bubbles 50 are entrapped.

The size of the trapped gas bubbles 50 can be controlled by adjusting the pressure applied to the gas bubbles 50 after coating the hardenable fluid 30 but before or during hardening of the hardenable fluid 30. Specifically, the size of the gas bubbles 50 can be increased by increasing the pressure applied to the gas bubbles 50, while the size of the gas bubbles 50 can be decreased by decreasing the pressure applied to the gas bubbles 50. The adjustment of the pressure of the gas bubbles 50 another control methods that can change the size of the bubbles 50 after the bubbles 50 are trapped.

The positions of the gas bubbles 50 may be controlled, for example, by adjusting the interfacial tension between the liquid resin and the molding surface of the mold 10. The positions can also be controlled by adjusting the viscosity of the liquid resin and the length of time from coating of the hardenable fluid to hardening thereof.

Figure 4:
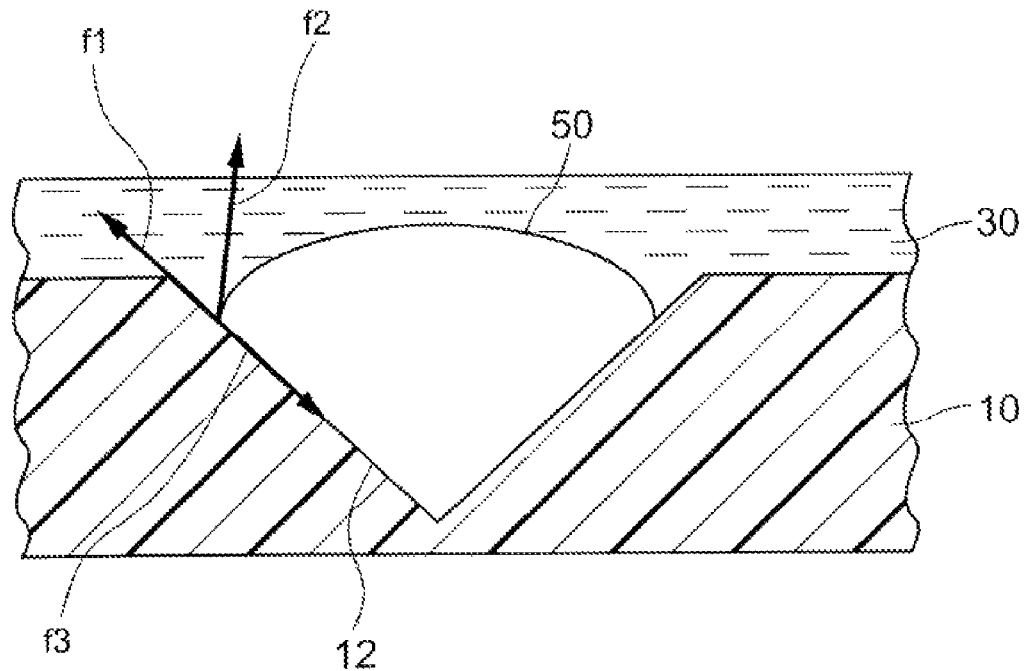
FIG. 4 is a schematic sectional view showing conditions for a bubble of gas existing at the surface of the mold in a depression (i.e., the gas bubble is positioned between the mold surface and the hardenable fluid).

In the process shown in FIG. 1B, the gas bubbles 50 should remain at the positions where the gas bubbles 50 contact the surfaces 12 and 13 of the depressions 11 until the liquid resin is hardened after the entrapment of the gas bubbles 50. As shown in FIG. 4, whether the gas bubbles 50 remain or not in contact with the mold surface in a depression can be influenced by the interfacial tension f1 between the hardenable fluid 30 and the mold surface 12 of the mold 10, the interfacial tension f2 between the hardenable fluid 30 and the gas bubbles 50, and the interfacial tension f3 between the gas bubbles 50 and the mold surface 12 of the mold 10. The position of the gas bubbles within the depression can also be influenced by gravity and buoyancy.

Among those process variables, the positions and shapes of gas bubbles 50 can be controlled especially by adjusting the interfacial tension f1 between the hardenable fluid and the mold surface 12 of the mold 10. Even if the contact angle between the hardenable fluid 30 and the mold is relatively high, the gas bubbles 50 can remain in the depression 11 if the viscosity of the hardenable fluid 30 is sufficiently high. Likewise, even if the contact angle between the hardenable fluid 30 and the mold is relatively high, when the hardenable fluid 30 is hardened rapidly (e.g., a UV curable resin can be irradiated with high intensity UV radiation very soon after coating), the gas bubbles 50 can remain in position long enough to function as part of the molding surface and can impart their shape to the resulting hardened layer.

Any other means known in the art for controlling the shape of the gas bubbles can be used. For example, means such as gravity, electromagnetism, or vibration (including ultrasonic vibration) can be used to control the shape of the gas bubbles.

In another aspect, a method is provided for preparing a second article having at least one convexity from the article having at least one concavity. The article having at least one concavity is used as a mold (second mold) to form the second article. FIGS. 1E to 1G illustrate one embodiment of a manufacturing method for the second article. In this embodiment, an article 31 manufactured as shown in FIG. 1A to 1D can be used as the second mold. A second hardenable fluid 60 is applied to the second mold 31 and hardened to form a second article 61 having a plurality of convex surfaces 62. FIGS. 1E to 1G are schematic sectional views illustrating the individual manufacturing processes to manufacture the second article 61 having a plurality of convex surfaces 62.

Like the manufacturing process shown schematically in FIGS. 1A to 1D, the manufacturing processes shown in FIG. 1E to 1G can also carried out in air. In FIG. 1E, a second mold 31 having a plurality of concave surfaces 32 is provided. In FIG. 1F, a second hardenable fluid 60 is applied to the second mold 31. The second hardenable fluid 60 is hardened to a second hardened layer 61. In FIG. 1G, the second hardened layer 61 is removed from the second mold 31 to obtain a second article having a plurality of convex surfaces 62. The shape of the convexities 62 correspond to the shape of the gas bubbles 50 used to impart the concavities to the second mold 31.

In FIG. 1E, the second mold (first article) 31 is provided that can be manufactured using the processes schematically illustrated in FIGS. 1A to 1D. In some embodiments, second mold 31 is prepared from a hardenable fluid 30 that is selected, for example, from a UV curable resin, soluble resin, thermoplastic resin, thermoset resin, or the like. Any of the hardenable fluids described above can be hardened to from the second mold 31.

In FIG. 1F, a second hardenable fluid 60 is applied to the second mold 31. Although any suitable application method can be used, the hardenable fluid 60 is often applied to the second mold 31 using a coating process. In contrast to the process schematically illustrated in FIG. 1B, however, gas bubbles are typically not deliberately entrapped during the process shown in FIG. 1F. Methods that may be difficult to use in the process of FIG. 1B can be used in the process of FIG. 1F. For example, processes such as injection, heat pressing, or electroforming can be used for applying the second hardenable fluid 60 to the second mold 31.

The second hardenable fluid 60 can be any material that is described above for use as the hardenable fluid 30. In some examples, the second hardenable fluid 60 can be selected to be a UV curable resin or a soluble resin. When the second mold 31 has sufficient heat resistance, a thermoplastic resin or a thermoset resin can also be used for the second hardenable fluid 60. The second hardenable fluid 60 can contain an additive such as, for example, a thickener, a curing agent, a crosslinking agent, an initiator, an oxidant inhibitor, an antistatic agent, a diluent, a detergent, a pigment, or a dye.

In some applications such as those where the at least one convexity will be used as a lens, the second hardenable fluid 60 is a polymeric resin that will result in the formation of a hardened layer that has good optical properties. For example, the polymeric resin can be a polymeric resin that includes polycarbonate, acrylic resin, polyester, epoxy resin, polyurethane, polyamide, polyolefin, or silicone (including modified silicone such as silicone polyurea, or similar material.

The hardenable fluid 60 is often applied to the second mold 31 using a coating method although other suitable application methods can be used. Suitable coating devices include, but are not limited to, a knife coater, a bar coater, a blade coater, and a roll coater. If the coating method is used, a deaeration process can be added before or after coating the second hardenable fluid 60 to remove any bubbles or air that might cause defects in the second article. Suitable dearation processes often include an evacuation step. The deareation process can often remove bubbles or air in the second hardenable fluid 60 or positioned between the second hardenable fluid 60 and the second mold 31.

The second hardenable fluid 60 is hardened to form the second hardened layer 61. When the second hardenable fluid is a UV curable resin, the second hardened layer 61 can be formed by irradiating with ultraviolet rays. When the second hardenable fluid 60 is a solution of a soluble resin, the second hardened layer 61 can be formed by removing the solvent such as by drying. When the second hardenable fluid 60 is a thermoplastic resin, the second hardened layer 61 can be formed by cooling the resin down to at least a softening temperature. When the second hardenable fluid 60 is a thermoset resin, the second hardened layer 61 can be formed by heating the resin to at least a hardening temperature.

Through the process shown in FIG. 1F, the second hardened layer 61 having a plurality of convex surfaces 62 can be formed. The convex surfaces 62 are the inversion of the outer shapes of the concave surfaces 32 of the second mold 31. Specifically, the convex surfaces 62 formed on the second hardened layer 61 can be substantially spherical convex surfaces that are similar to the outer shapes of the gas bubbles 50 used to impart the concavities to the second mold 31. Thus, a second article having at least one substantially spherical convex surfaces such as an arranged pattern of substantially spherical convex surfaces can be prepared.

In some embodiments of the article 61, a first surface of the article has multiple convexities and a second surface opposite the first surface is flat. The flat surface can have a matte or glossy finish. The surface roughness of either surface can be, for example, less than 100 nanometers, less than 50 nanometers, less than 10 nanometers, or less than 5 nanometers.

In the process shown in FIG. 1G, a second article 61 having a plurality of convex surfaces 62 can be obtained by removing the hardened layer 61 formed in the process shown in FIG. 1F from the second mold 31. It is also possible to coat another resin material or the like on the convex surfaces 62 of the manufactured second article 61.

The second article can be prepared using a continuous manufacturing process. By repeatedly providing additional second molds 31 to a coating device, the second hardenable fluid 60 can be repeatedly applied to each additional second mold 31. Each additional hardenable fluid 60 can be hardened to form second articles 61 having at least one convexity. By repeating the processes shown in FIG. 1A to 1D and the processes shown in FIG. 1E to 1G, articles 31 each having a plurality of concave surfaces 32 and second articles 61 each having a plurality of convex surfaces 62 can be manufactured continuously.

Similar processes to those shown in FIGS. 1A to 1G can be used to provide articles having at least one convexity on a first surface as well as on a second surface opposite the first surface. In one such process, the second article can be prepared that has at least one convexity. A third article can then be prepared by contacting the second article with a hardenable fluid layer. For example, the finished second article can be laminated to the hardenable fluid layer 60 shown in FIG. 1F. That is, a hardenable fluid layer 60 can be positioned between a finished second article and the second mold. When the hardenable fluid layer 60 is hardened, the second article would adhere and the resulting third article can have convexities on two opposite surfaces. The second mold could then be removed to provide the third article. In another process, two finished second articles can be laminated using a hardened fluid layer 60 positioned between the two second articles. The hardened fluid layer would face a flat surface of the two second articles.

Alternatively, a hardenable fluid layer can be positioned between two second molds 31. The hardenable fluid layer would face a flat surface of the two second molds. Upon hardening of the hardenable fluid layer, the resulting third article would have concavities on two opposite surfaces.

An adhesive layer can be positioned between a first article and a second article, between a first article and another first article, or between a second article and another second article to provide articles having concavities or convexities on multiple surfaces. In these embodiments, the adhesive layer would face a flat surface of the first article and a flat surface of the second article.

Regarding the process shown in FIG. 1F and FIG. 1G, other conventional molding process can be used. For example, molding process described in U.S. Pat. No. 6,761,607 or U.S. Pat. No. 6,758,992 can be used.

Figure 3B:
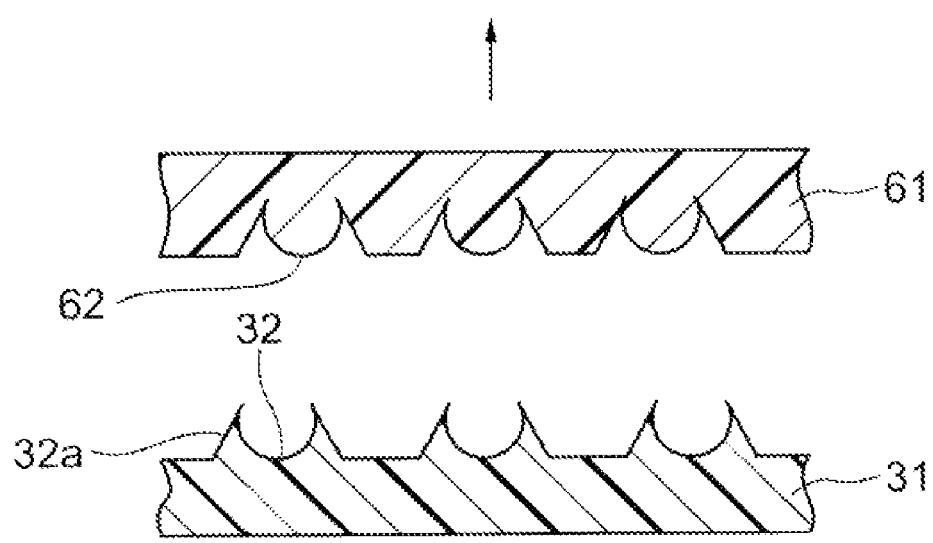
FIG. 3B is a schematic sectional view exemplifying another embodiment of a method of manufacturing a second article having at least one convexity.

FIG. 3B shows a process similar to the process shown in FIG. 1G. FIG. 3B illustrates an exemplary process that can be used to obtain a second article 61 having convex surfaces 62 by removing a second hardened layer 61 from the second mold 31 that has concavities 32 with a sharper edged overhang portion 32*a* in comparison to the corresponding concavities shown in FIG. 1G. If both the second mold 31 and the second hardened layer 61 are both hard in the process exemplified in FIG. 3B, it can be difficult to separate the second mold 31 without damaging the hardened layer 61.

A removal process that damages the hardened layer 61 is depicted as case 1 in the sectional views of FIGS. 6A and 6B. The second mold in FIG. 6A is made of a material that is not readily soluble in water or an organic solvent. When the hardened layer 61 is removed from the second mold 31, the hardened layer 61 interferes with the overhang portion 32*a* of the second mold 31. If the hardened layer 61 and the second mold 31 are both are hard and not flexible, damage is likely. FIG. 6B illustrates that the hardened layer 61 and the second mold 31 can both be damaged. The overhang portion 32*b* is broken off of the second mold 31.

One method of removing the hardened layer 61 from the second mold 31 without damaging the hardened layer 61 is depicted as case 2 in the sectional views of FIGS. 6C and 6D for case 2. In FIG. 6C, the second mold is formed of a soluble material such as water-soluble resin. In FIG. 6D, the second mold is removed by dissolution. Since the second mold 31 is dissolved by water, the hardened coating layer 61 is removed undamaged from the second mold 31. Although the second mold 31 in FIG. 6C is a water-soluble resin, a similar process can be used with any other mold materials that can be dissolved with another type of solvent such as an organic solvent or a solution containing an acid or base.

In other examples, the second mold 31 can be readily separated from the hardened layer 61 when a thermoset resin is used for the hardened layer 61 and a thermoplastic resin is used for the second mold 31. The second mold can be heated to at least the softening temperature to remove it readily from the hardened layer 61 without damaging the hardened layer 61.

The manufactured second article 61 is an article having at least one convex surface 62. Some second articles have an arranged pattern of convexities such as a lattice pattern. The convex surfaces 62 are often substantially spherical convex surfaces that correspond to the outer surfaces of the gas bubbles 50 used to form the concavities in the second mold 31. The size of the convex surface 62, as measured by the cross-sectional area of the base, is often in the range of 0.01 $\mu m^2$ to 1000 $mm^2$. The height of the convex surface 62 often ranges from 0.1 μm to 100 mm. Convexities outside this range can also be prepared and the size is dependent on the particular use chosen for the articles.

In some second articles 61, there is a plurality of convexities arranged in a pattern. Some arranged patterns are arranged in lattice patterns such as an arranged square lattice pattern. Additionally some of the articles have substantially identical convex surfaces 62. When the convex surfaces 62 are spherical and substantially transparent or translucent, they can be used as lenses or an array of lenses. Some of the convexities 62 can be used as microlenses or microlens arrays.

Additionally, the second article 61 can have another layer of material coated on the convex surfaces 62. In this case, if the convex surfaces 62 are used as lenses, the coating layer can be used as a protecting layer or can be used to adjust the refractive index. A lens having a wide range of refractive indexes can be obtained by coating materials having various refractive indexes as the outermost layer of the lens.

When forming a second article 61 using a first article 31 as a mold, the first article 31 need not be removed from the second article 61. That is, the first article 31 can remain adjacent to the second article 61; for example, the second article 61 can be laminated to the first article 31. Another single coating layer or multiple coating layers can be formed on the second article 61. In this case, the first article 31 remaining on the second article 61 or any additional coating layer can be used as a protecting layer for the second article 61, or as a layer for adjusting the optical characteristics of the second article 61.

Figure 8:
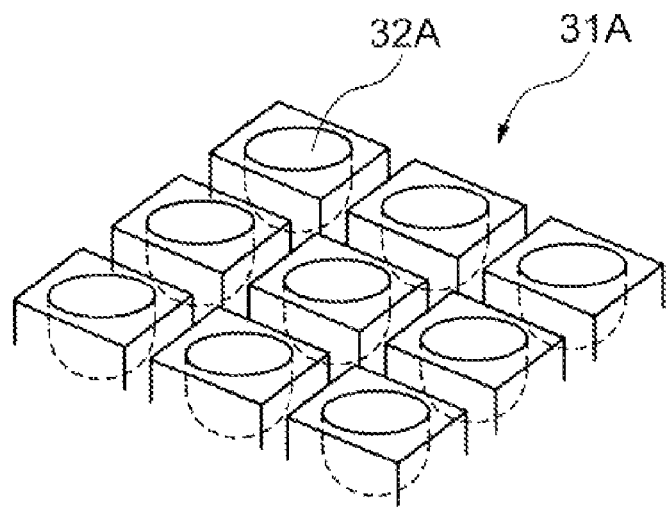
FIG. 8 is a schematic perspective view showing one example of an article having concavities arranged in a lattice pattern.
Figure 9:
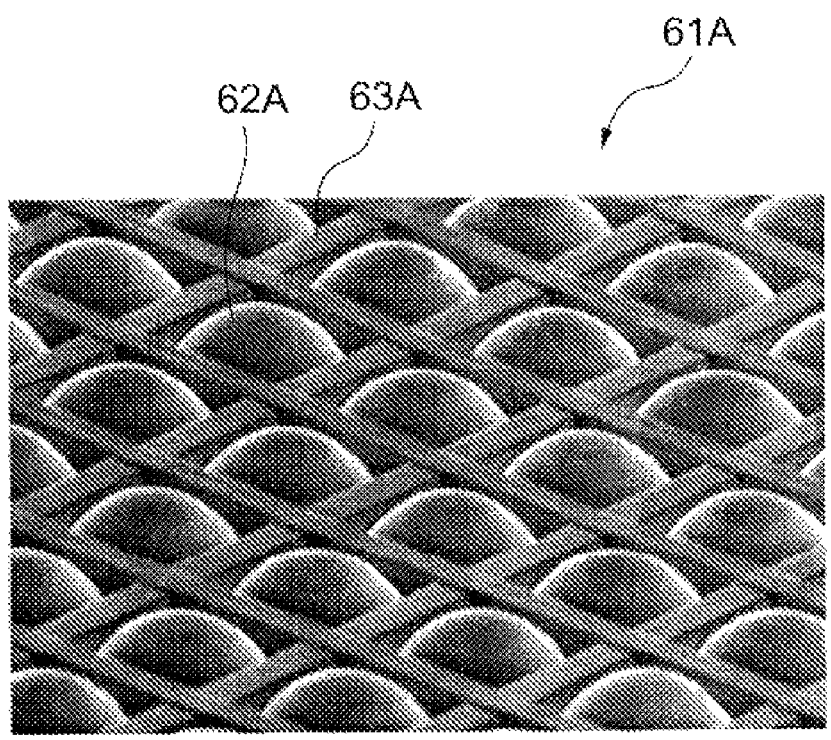
FIG. 9 is a scanning electron micrograph showing one example of a second article having convexities arranged in a lattice pattern.

As shown in the FIG. 1G, the manufactured second article 61 can have a shape in which each convex surface 62 is surrounded by a horizontal wall 63 because the second mold 31 has a shape in which each concave surface 32 is surrounded by a groove-like portion 33. Because the shape of the second article 61 is the inversion of the article 31, the second article 61 has horizontal walls 63 corresponding to the groove-like portions 33 of the second mold 31. See FIG. 8 schematically showing an exemplary three-dimensional article 131 and FIG. 9 showing an exemplary three-dimensional article 161. One way to handle the second article 61 having a shape in which each convex surface 62 is surrounded by the horizontal wall 63 is to positively utilize the horizontal walls 63 as optical components such as prisms.

In other embodiments, the second article 61 does not have horizontal walls 63 between the convexities 62. The horizontal walls 63 can be removed from the manufactured second article 61 by a post-processing. If the horizontal walls 63 are formed but not desired, they can be removed using any suitable mechanical, physical, or chemical means. When the second article 61 having the convex surfaces 62 is adapted to a lens member, for example, it is possible to provide microlenses in which lens portions having spherical surfaces are arranged on a sheet by removing the horizontal wall 63 formed between the adjacent convex surfaces 62 of the second article 61. Additionally, the curvature can also be altered by further processing the curved surface portions of the convex surfaces 62. An article could be manufactured in which partly-cutaway convex surfaces are formed by cutting off a given portion of each of a plurality of convex surfaces 62.

Figure 11:
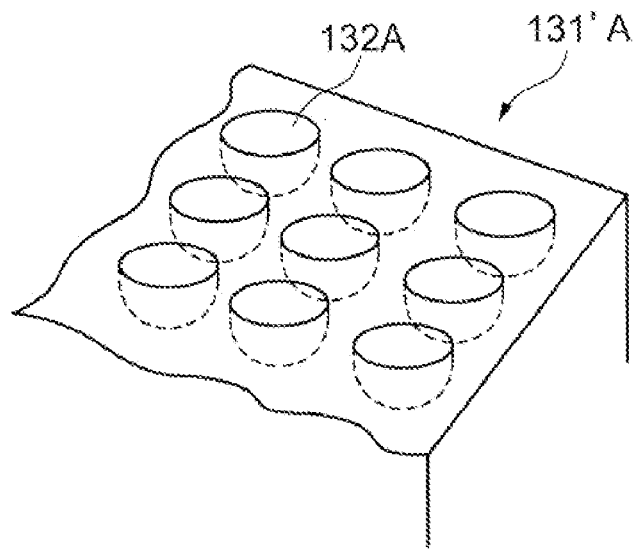
FIG. 11 is a schematic perspective view showing another example of an article having multiple concavities arranged in a lattice pattern.
Figure 12:
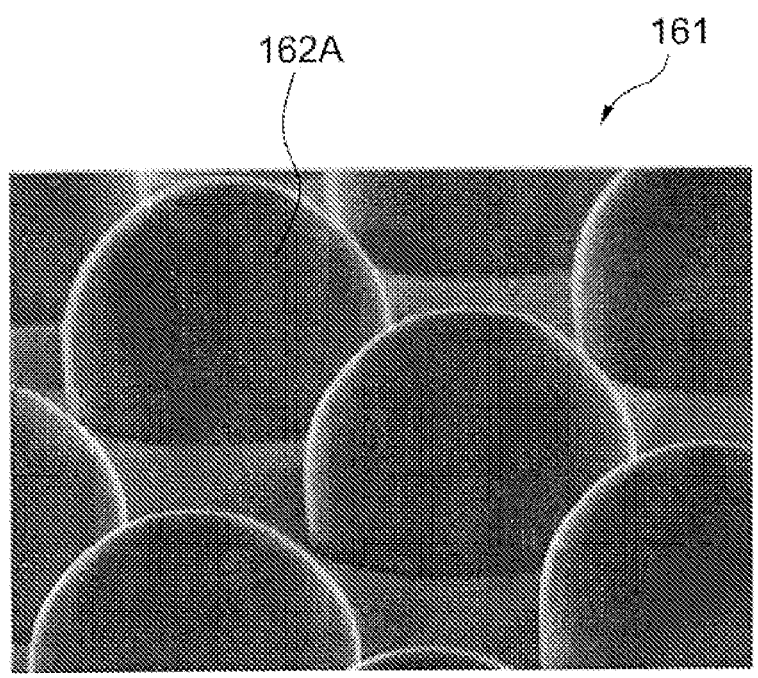
FIG. 12 is a scanning electron micrograph showing another example of a second article having multiple convexities arranged in a lattice pattern.

Alternatively, the second article can be prepared using a mold that does not result in the formation of the horizontal walls 63. More particularly, the groove-like portion can be eliminated between adjacent concave surfaces of the second mold. One such second mold 31 can be manufactured, for example, as illustrated schematically in FIGS. 7A to 7D. The second article 161 having a shape in which each convex surface 162 is not surrounded by a wall is manufactured as shown in FIG. 7E to 7G. FIG. 11 shows a three-dimensional example corresponding to the article 131'A and FIG. 12 showing a three-dimensional corresponding to the second mold 161.

The manufacturing processes shown in FIGS. 7A to 7D are similar to the processes shown in FIGS. 1A to 1D; however, a two piece mold is used rather than a one piece mold. The first piece of the mold is a first layer having at least one opening such as a pattern of openings. The second piece of the mold is laminate to the first layer. The resulting two piece mold can have depressions consisting of the opening of the first layer and a surface of the second layer.

Figure 7A:
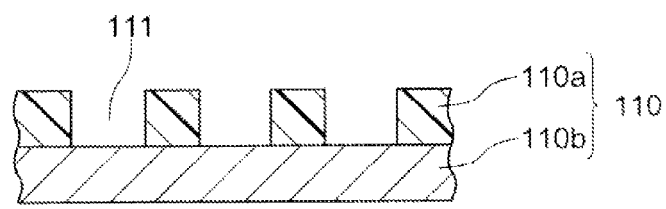
FIGS. 7A to 7D are schematic sectional views exemplifying another embodiment of a method of manufacturing a first article having at least one concavity.
Figure 7B:
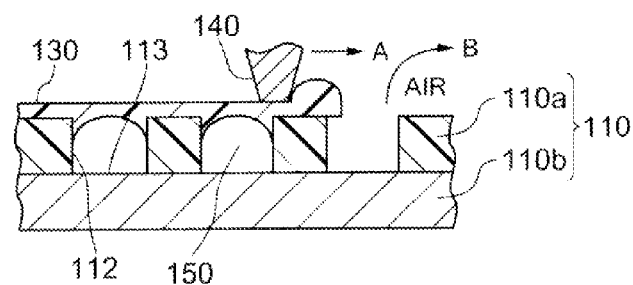

The two piece mold 110 of FIG. 7A has a side wall portion 110*a* corresponding to the first layer mentioned above and a bottom portion 110*b* corresponding to the second layer mentioned above. The first layer and the second layer are separable each other, and as a result, as shown in FIG. 7D, the side wall portion 110a can be removed from the bottom portion 110b along with hardened layer 131.

The two piece mold 110 can be prepared from any materials described above for the mold 10. For example, an organic resin material such as polyimide, polypropyrene, polyethylene, polystyrene or poly-cyclo-olefin can be used. Alternatively, other organic materials, inorganic materials including a metal such as nickel, copper, or brass, glass or ceramics, or organic-inorganic composite material can be used. Preferably, a material chosen for the side wall portion 110a (first layer) is different from a material chosen for the bottom portion 110b (second layer). For example, an organic resin material can be used for the side wall portion 110a, and an inorganic material such as metal, glass or ceramic can be used for the bottom portion 110b.

The two piece mold can be made by the following process. First, a layered sheet having a first layer and a second layer laminated on the first layer can be prepared. Then openings can be formed in the first layer using any suitable method. In some methods of forming the opening, a dry etching method such as laser ablation or a wet etching method using a mask can be used. If the first layer material is different from the second layer material, the opening patterns can be formed only in the first layer.

Suitable layered sheets are commercially available but can also be manufactured by the following process. The first layer can be prepared and then the second layer can be provided to contact the first layer. The second layer can be formed on the first layer using any method including, for example, coating, deposition, electroforming or the like. For example, a polymeric resin sheet can prepared as the first layer. Then second layer can be formed on the first layer by chemical deposition, physical deposition, or electroforming a metal.

Figure 7C:
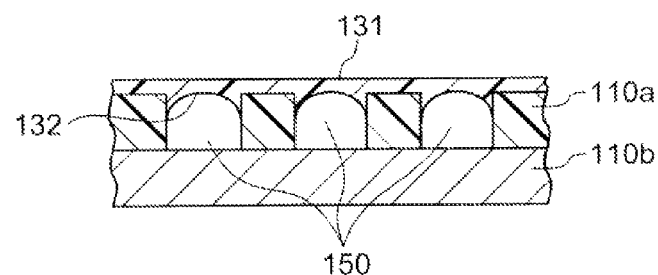
Figure 7D:
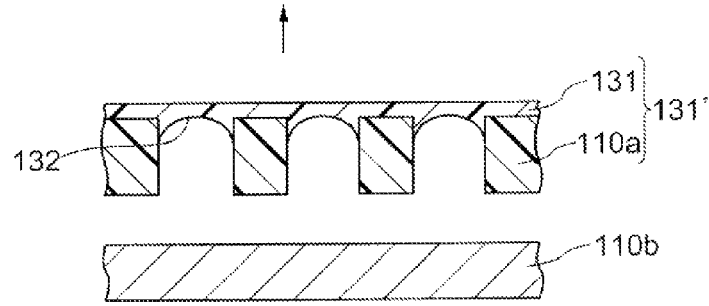
Figure 7E:
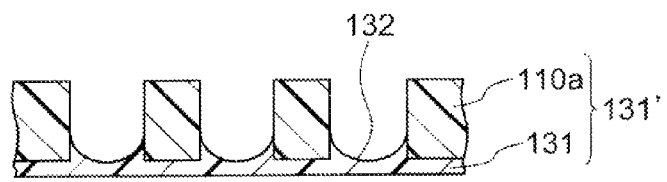
FIGS. 7E to 7G are schematic sectional views exemplifying another embodiment of a method of manufacturing a second article having at least one convexity.
Figure 7F:
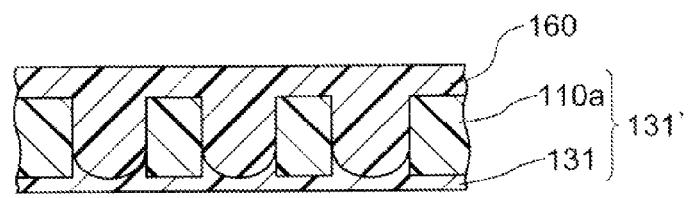
Figure 7G:
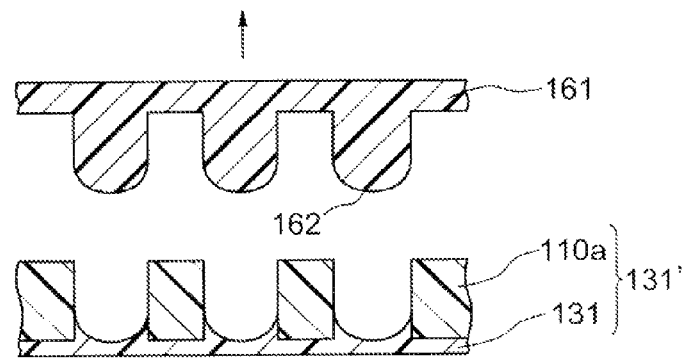

In the process shown in FIG. 7D, the hardened layer 131, which is formed by the process shown in FIG. 7C, and the side wall portion 110a are removed from the bottom portion 110b of the mold 110. Upon removal from the bottom portion 110b of the mold, the hardened layer 131 and the side wall portion 110a are connected together to obtain an article 131'. The article 131' is configured so that each concave surface 132 is surrounded by the side wall portion 110a. In other words, any grove-like portion does not exist between adjacent concave surfaces 132.

The removing process shown in FIG. 7D can be performed by selective etching of the bottom portion 110b of the mold 110. For example, if the bottom portion 110b is made of metal such as copper or nickel and the side wall portions 110a are made of polymeric resin such as polyimide, the bottom portion 110b can be removed by such a selective etching. For example, the metal can be dissolved with an acidic solution.

Manufacturing processes shown in FIGS. 7E to 7G are similar to the processes shown in FIGS. 1E to 1G. However, a second article 161 is manufactured using the second mold 131' having a shape in which any grove-like portion does not exist between adjacent concave surfaces 132. As a result, as shown in FIG. 7G, a second article 161 having a shape in which each convex surface 162 is not surrounded by a horizontal wall is manufactured. In the other points, the processes shown in FIG. 7E to 7G are similar to the processes shown in FIG. 1E to 1G.

The second article 161 in which each convex surface 162 is not surrounded by a horizontal wall can be obtained by using the second mold 131' in which a groove like portion does not exist between adjacent concave surfaces 132. When the second article 161 having the convex surfaces 162 not surrounded by horizontal walls is adapted to a lens member, for example, the second article has a construction without a prism or rib portion. Such an article is well suited for a lens such as a microlens because there is no horizontal wall between adjacent convex surfaces 162 (equivalent to lens portion) of the second article 161. See FIG. 13 for a three-dimensional representation of the second mold 131'B and FIG. 14 for a three-dimensional representation of the second article 161B.

In addition to the use of the first article or the second article as a lens or as an array of lenses, the first article or the second article can be used as a mold. For example, the first article or the second article can be used to prepare a metal stamper. In one exemplary process, the first metal layer such as chromium or copper can be deposited on a surface of the first article or on a surface of the second article. Then, a second metal layer such as a nickel metal layer can be deposited on the first metal layer. The second metal layer can then be removed resulting in a second metal stamper such as a nickel metal stamper that has the same shape as the first article or the second article.

The embodiments of the method of making a first article that has a surface comprising at least one concavity or an arranged pattern of concavities, the method of making a second article using the first article as a second mold, the first article, and the second article are not limited to those described above, and various other embodiments are within the scope of the invention.

EXAMPLES

These examples are for illustrative purposes and are not meant to be limiting on the scope of the appended claims. Examples of the first and second articles were manufactured and tested. These examples are described referring to the accompanying drawings.

Examples 1-1 to 1-9

The influence of the interfacial tension between the hardenable fluid and a mold surface were investigated. Nine kinds of test plates with flat surfaces were prepared and the contact angles of the hardenable fluid (e.g., liquid resin) on the flat surfaces of the test plates were measured. Further, test articles were manufactured using nine kinds of test molds that were made of the same materials of the test molds respectively according to the manufacturing process shown in FIG. 1A to FIG. 1D.

Liquid Resin: A UV curable resin was used as the hardenable fluid. The composition of the UV curable resin contained 90 parts by weight (pbw) of a UV hardenable acrylate, which was a polyester base urethane acrylate (commercially available under the trade designation EBECRYL 8402 from DAICEL-CYTEC Co., Ltd.), 10 pbw of an unsaturated aliphatic acid hydroxylalkylester modifier E-carprolactone (commercially available under the trade designation PLACEL FA2D from Daicel Chemical Industries, Ltd.), and 1 pbw of a photopolymerization initiator (commercially available under the trade designation IRGACURE 2959 from Ciba Specialty Chemicals Inc.).

Test Plates: Each of the nine test plates had a flat surface. Materials used for the test plates are described below.

Test Molds: All test molds had depressions in the shape of a quadrangular pyramid having a depth of 50 µm, an apex angle of 90 degree, and a square bottom shape. Each side of the square bottom was 100 µm. The depressions were arranged in a square lattice pattern with pitches of 100 µm. Materials used for the test molds are described below.

Materials for the Test Plates and the Test Molds:

Test Plate 1 and Test Mold 1 were prepared from a two component room temperature vulcanizable (RTV) silicon rubber, which is commercially available under the trade designation ELASTOSIL RT 601 from Wacker Asahikasei Silicone Co., Ltd.

Test Plate 2 and Test Mold 2 were prepared from a two component RTV silicon rubber, which is commercially available under the trade designation ELASTOSIL M4470 from Wacker Asahikasei Silicone Co., Ltd.

Test Plate 3 and Test Mold 3 were prepared from polypropylene, which is commercially available under the trade designation NOVATEC MA-3 from Japan Polypropylene Co., Ltd.

Test Plate 4 and Test Mold 4 were prepared from polystyrene, which is commercially available under the trade designation GPPS G9401 from Japan Polystyrene Inc.

Test Plate 5 and Test Mold 5 were prepared from polyethylene, which is commercially available under the trade designation HY-430 from Japan Polyethylene Co., Ltd.

Test Plate 6 and Test Mold 6 were prepared from polycarbonate, which is commercially available under the trade designation IUPILON H-3000R from Mitsubishi Engineering-Plastics Co., Ltd.

Test Plate 7 and Test Mold 7 were prepared from polypropylene, which is commercially available under the trade designation POLYPRO3445 from Exxon Mobil Co.

Test Plate 8 and Test Mold 8 were prepared from polymethylmethacrylate, which is commercially available under the trade designation LG35 from Sumitomo Chemical Co., Ltd.

Test Plate 9 and Test Mold 9 were prepared from nickel plate that was manufactured using electroforming.

The hardenable fluid, which was the UV curable resin, was coated on a surface of each test mold using a knife coater to form a coated layer. The coating device was a knife coater with a 150 mm width. A PET film was positioned over the UV curable resin such that the UV curable resin was between the test plate and the PET film. The coating thickness of the UV curable resin was 150 μm. The coated layer was cured after coating using ultraviolet radiation of 3450 mJ/cm$^2$ from a UV lamp obtained from Ushio, Inc. The hardened resin was then removed from the test mold.

TABLE 1

Figure 5:
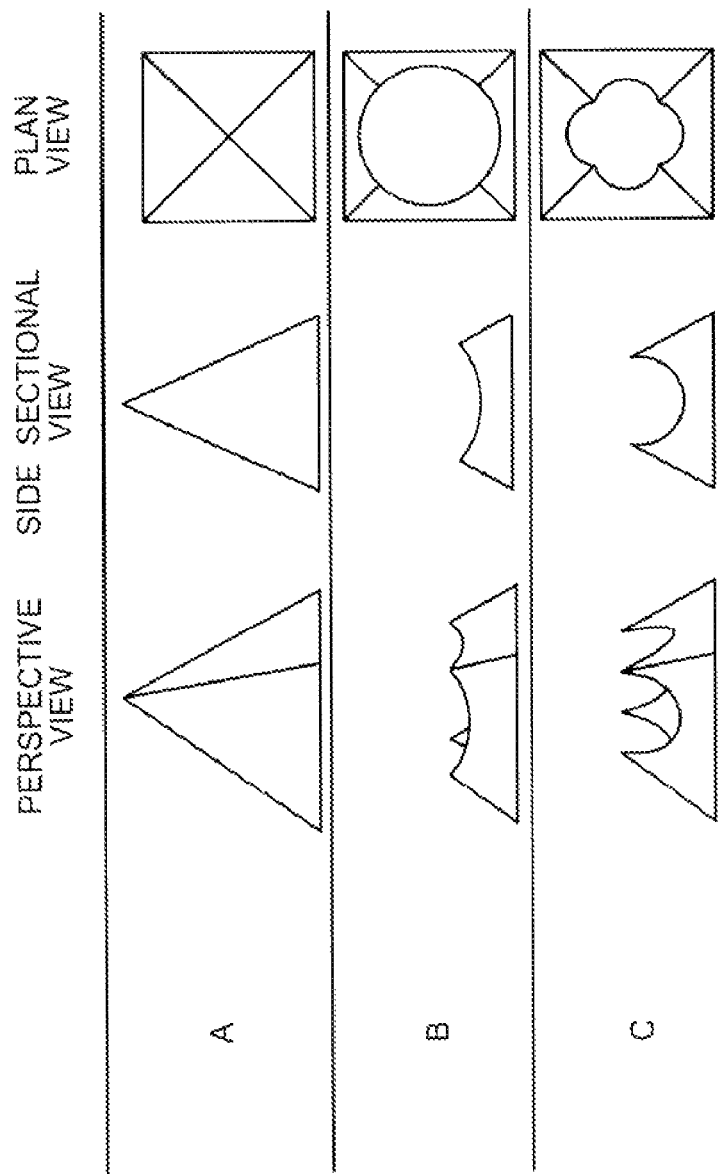
FIG. 5 is an exemplary diagram showing the position of gas bubbles within a depression of a mold.

| Example | Test Plate No. and Test Mold No. | Contact Angle [degree] of Liquid Resin on Test Plate (Average of 10 samples) | Article made using Test Mold shown in FIG. 5 |
| --- | --- | --- | --- |
| 1-1 | 1 | 63.4 | A |
| 1-2 | 2 | 60.9 | A |
| 1-3 | 3 | 59.5 | B |
| 1-4 | 4 | 41 | C |
| 1-5 | 5 | 57.3 | C |
| 1-6 | 6 | 34.5 | C |
| 1-7 | 7 | 64 | B |
| 1-8 | 8 | 33.4 | C |
| 1-9 | 9 | 38.2 | C |

Under the above test conditions, the contact angle between the UV resin and the mold was changed by changing the material of the test plate. The relationship between the contact angle (between the UV resin and the test plate) and the position and shape of the gas bubble 50 entrapped in the test mold depressions were studied. Table 1 shows the average values of the measured values of the contact angle between the liquid resin (UV curable resin) and the test plates. The average values of ten measurements are given in Table 1.

The static contact angles were measured using an instrument commercially available under the trade designation DROPMASTER 700 from Kyowa Interface Co., Ltd., and the static contact angle was measured by the sessile drop method at room temperature.

FIG. 5 is a diagram exemplifying the relationship between the contact angle and the position and the shape of the gas bubbles within the mold depressions. More particularly, FIG. 5 shows three representative types A to C of the concavities made by the manufacturing process using the test molds. In FIG. 5, a perspective view (left), a side sectional view (center), and a plane view (right) of the articles manufactured.

Articles made using Test Molds 1 and 2, corresponding to a contact angle greater than 60 degree, were Type A where the gas bubbles do not stay in the depressions. That is, no gas bubbles remained in the depressions. Articles made using Test Molds 3 and 7 were Type B. The gas bubbles remained at the top portions of the quadrangular pyramid depressions and the curvature of the convex surfaces of the gas bubbles were relatively small (the diameters were relatively large). The outer shape of the gas bubbles was approximately sherical as seen from the top or bottom side of the quadrangular pyramid. Articles made using Test molds 4-6, 8 and 9, were Type C. The gas bubbles remained at the top portions of the quadrangular pyramid depressions and the curvature of the convex surfaces of the gas bubbles were larger than for Type B (the diameter is smaller than for Type B). The outer shape of the gas bubbles became nearly a four-leaved shape as seen from the top or bottom side of the quadrangular pyramid.

According the test result, the positions and shapes of the gas bubbles could be at least partially controlled by adjusting the interfacial tension (contact angle) between the UV resin and the mold surface. Various other variables such as the viscosity of the UV resin and the time from coating to hardening of the UV resin can also affect the position and shape of the gas bubbles. For example, even if the contact angle between the UV resin and the mold exceeds 60 degrees, gas bubbles can remain in the depressions if the viscosity of the UV resin is sufficiently high. Likewise, even if the contact angle between the liquid resin and the mold exceeds 60 degrees, when the UV resin is hardened by high-intensity ultraviolet irradiation in a short period of time after coating, the gas bubbles can remain for a time sufficient for the UV resin to harden.

Example 2-1

In Example 2-1, a polypropylene mold was prepared. Initially, depressions were made on a surface of the copper plate using a cutting machine. Then a surface of the copper plate was oxidized by dipping the copper plate in an oxidizing agent. A nickel layer was formed on the oxidized surface of the copper plate by electroplating. After electroplating, the nickel layer was removed from the copper plate. Polypropylene, which is commercially available under the trade designation POLYPRO3445 from Exxon Mobil Co., was melted into the nickel mold at 200 to 250° C. and then was cooled down to room temperature (20 to 25° C.). The hardened polypropylene mold was removed from the nickel mold. The resulting mold (sheet) had a square lattice pattern of depressions. The depressions were quadrangular pyramid concavities that had a depth of 50 μm, an apex angle of 90 degrees, and a square bottom shape. Each side of the square bottom was 100 μm and the pyramids were arranged at pitches of 100

μm. The shape of the quadrangular pyramid depressions is exemplified in a planar view in FIG. 2A.

The polypropylene mold (sheet) was cut to make a piece (8 cm in width and 10 cm in length) that was adhered onto a polyethylene terephthalate (PET) film having a thickness of 50 μm (15 cm in width and 30 cm in length) to make a sheet mold. The PET film is commercially available under the trade designation "TEIJIN TETRON FILM A31 fro Teijin Dupon Films Japan Limited. The polypropylene mold (sheet) was adhered to the PET film using double-faced adhesive tape that is commercially available from 3M under the trade designation 3M SCOTCH TAPE.

Another PET film having a thickness of several ten μm (15 cm in width and 30 cm in length) was prepared as a transparent cover sheet. The PET film was the same as described above.

Around 10 cc of the UV curable resin was dropped on a surface of the sheet mold, wherein the UV curable resin was provided along one side of the area having the depressions. The UV curable resin used in this example is the same as the UV Resin used in Example 1 and the viscosity thereof was about 10,000 mPas (measured by B-type viscometer).

One side of the cover sheet was laid on the sheet mold, however, the rest of the cover sheet was kept apart from the sheet mold. Next, the one side of the set of the sheet mold and the cover sheet ("set of the sheets") was placed on a knife coater having a knife edge that is 150 mm wide. The set of sheets was then moved under the knife edge at the speed of 16 cm/sec ("coating speed") and the UV curable resin was spread between the sheets at the thickness of 200 μm and coated over the depressions of the sheet mold while air around the mold was entrapped at each depressions. The coating process was carried out in the air at room temperature (about 20-25 degree C.).

Then, a ultraviolet light (Ushio Inc.) was used to irradiate the UV curable resin on the mold sheet through the transparent PET cover sheet with ultraviolet rays of 3450 mJ/cm². The radiant intensity was measured at the surface of the UV resin layer using an ultraviolet light meter (UV-350 from ORC Manufacturing Co., Ltd.). The UV curable resin polymerized and formed a hardened layer. After polymerization, the transparent PET cover sheet was taken off the mold sheet. The hardened layer was removed from the polypropylene mold by hand. In this manner, an article having concave surfaces (an article having an arranged lattice pattern of concavities) was obtained from the UV curable resin.

Example 2-2

The hardenable fluid contained 20 weight percent polyvinyl alcohol as a water-soluble resin (commercially available under the trade designation KURARY POVAL PVA-217 from Kurary Co., Ltd.) and 80 weight percent distilled water. That is, the hardenable fluid contained 20 weight percent PVA-217 in an aqueous mixture. Using the article having concave surfaces manufactured in Example 2-1 as the second mold, the hardenable fluid was dropped onto the second mold to cover the concavities and then a deaeration process was used to prevent the formation of bubble defects. The atmospheric pressure was reduced to less than 1000 Pa for 15 minutes. After deareation, the hardenable fluid was spread and set at a thickness of 200 micrometer using the knife coater. Then, the hardened layer was obtained by drying the coating layer for two hours in an oven at 60 degree C. and was then overnight at room temperature. After drying, the hardened layer was removed from the second mold. The resulting article made of a polyvinyl alcohol resin had convex surfaces (the article had an arranged lattice pattern of convexities).

Example 2-3

Using a manufacturing method similar to that used in Example 2-1, articles having concave surfaces were obtained by varying the time from coating of the UV curable resin to hardening thereof. The start time of hardening, which is the length of time between coating and hardening, was 0 minute, 30 minutes, or 60 minutes. During any time between coating and hardening, the samples were stored under ambient light.

The resulting articles having concave surfaces were imaged using a scanning electron microscope (SEM) (VE-7800, Keyence Co., Ltd); the image obtained is hereinafter called a "SEM image". In the SEM image of the concave surface portions observed substantially vertically above, the maximum diameters of the concave surface portions were measured at five positions. The average value of the measurements was determined to be the average diameter of the concave surfaces.

The following Table 2 shows the relationship between the time from coating to hardening and the average diameter of the concave surfaces for this example.

TABLE 2

| UV curable resin | Drying temperature, °C. | Concentration, weight percent | Viscosity, mPa-sec | Time from coating to hardening, min. | Ave. diameter, micrometers |
|---|---|---|---|---|---|
| PVA-217 | 60 | 20 | 60000 | 0 | 78.7 |
|  |  |  |  | 30 | 78.4 |
|  |  |  |  | 60 | 78.0 |

Example 2-4

An article was prepared as described in Example 2-1 except that the mold was varied. More particularly, a nickel mold was used and the shape of the depressions provided in the mold was changed to a square cylinder from a quadrangular pyramid. The square cylinders each had a square bottom shape with each side of the square being 115 μm. The depressions were arranged in a square lattice pattern at pitches of 140 μm. This nickel mold was prepared from a copper plate. Depressions were made on a surface of the copper plate using a cutting machine. Then a surface of the copper plate was oxidized by dipping the copper plate in an oxidizing agent. Then, a nickel layer was formed on the oxidized surface of the copper plate by electroplating. After electroplating, the nickel layer was removed from the copper plate.

FIG. 8 shows a perspective view of the article 31A obtained that had concave surfaces 32A. The article 31A had an arranged pattern of concavities. Each concave surface has a substantially the same shape, and was surrounded by a groove-like portion.

An article having convex surfaces was obtained using the obtained article 31A having concave surfaces as the second mold under the same conditions as those of Example 2-2. FIG. 9 shows a perspective view of the obtained article 61A having convex surfaces 62A (article having an arranged pattern of convexities). Each convex surface has a substantially the same shape, and is surrounded by a wall 63A.

Example 2-5

An article having concave surfaces was prepared using a process similar to that used to prepare Example 2-1 except with a different mold. The depressions in the mold were changed to a quadrangular prismoid from a quadrangular pyramid. The material of mold was a silicone resin sheet made of ELASTSIL M4470 from Wacker Asahikasei Silicone Co., Ltd. The quadrangular prismoid depressions each had a square bottom shape with each side of the square bottom being 25 µm and a square top shape with each side of the square top being 50 µm. The depressions were arranged in a square lattice pattern with pitches of 50 µm. An article having concave surfaces (an article having an arranged lattice pattern of concavities) was manufactured.

This article was then used as a secondary mold under conditions similar to those used in Example 2-2 except that the second hardenable resin was different. For this example, a 15 weight percent polyvinyl alcohol as a water-soluble resin (KURARY POVAL™ PVA-205, Kurary Co., Ltd.) and 85 weight percent distilled water were mixed. This 15 weight percent PVA-205 aqueous mixture was coated on the second mold. An article made of a polyvinyl alcohol resin having convex surfaces (an article having an arranged pattern of convexities) was prepared.

Comparative Example 1

An article was obtained by performing processes similar to those of Example 2-1 except that after coating of the UV curable resin, the UV curable resin was left under vacuum for 15 minutes to remove gas bubbles entrapped at the time of coating. The outer shapes of gas bubbles were not imparted to the resulting article. Rather, the shape of the mold surface (including the depressions) was imparted to the article.

Example 3-1

The hardenable fluid contained 20 weight percent polyvinyl alcohol, which is commercially available under the trade designation KURARY POVAL PVA-205 from Kurary Co., Ltd., and 80 weight percent distilled water. This hardenable fluid was a water-soluble resin. A polypropylene sheet, identical to the sheet used in Example 2-1, was used as the mold.

The coating process was performed as described in Example 2-1 except for the liquid resin. More specifically, the water-soluble resin was coated on the mold using a knife coater, thereby forming a coating layer with a thickness of 200 µm. The coating speed was 16 cm/sec and air was entrapped around the mold.

The coating layer was subsequently dried for two hours in the oven at 60 degree C. The coating layer was further dried at room temperature overnight to form a hardened layer. The hardened layer was removed from the polypropylene mold, thus obtaining an article having concave surfaces made of a water-soluble resin (the article had an arranged pattern of concavities). The curvature of the concave surfaces was smaller than those of Example 2-1.

Example 3-2

Using the article having concave surfaces manufacture in Example 3-1 as the second mold, a UV curable resin identical to that used in Example 2-1 was coated on the second mold with a thickness of 200 µm. The UV curable resin layer was placed in contact with a 50 µm PET film. A deaeration process was performed by reducing the atmosphere pressure in the same manner as Example 2-2. Then, a hardened layer was formed by irradiating the UV curable resin from the PET film side with ultraviolet rays of 3450 mJ/cm² using the same ultraviolet lamp used in Example 2-1. After polymerization, the hardened layer was removed from the second mold to obtain an article made of a UV curable resin having convex surfaces (the article had an arranged pattern of convexities).

Example 3-3

Articles were prepared using a process similar to that described in Example 3-1 but with different concentrations of polyvinyl alcohol in the hardenable fluid. The polyvinyl alcohol is commercially available under the trade designation KURARAY POVAL PVA-205 from Kurary Co., Ltd. Distilled water was mixed with the polyvinyl alcohol to prepare aqueous mixtures respectively having 5 wt % of PVA-205, 10 wt % of PVA-205, 15 wt % of PVA-205, 25 wt % of PVA-205, and 30 wt % of PVA-205. After the preparation of the hardenable fluid compositions, each sample was coated on the polypropylene mold shown in FIG. 2A at a thickness of 200 µm using a coating speed of 16 cm/sec.

Each coating layer was dried for two hours in the oven at 60 degree C. and further dried at room temperature (about 25 degree C.) overnight to form a hardened layer. Thereafter, each hardened layer was removed from the polypropylene mold, thus obtaining articles with concave surfaces made of polyvinyl alcohol.

In the SEM images observed substantially vertically above the concave surfaces, the maximum diameters of the concave surface portions were measured at five positions. The average value of the measurements was determined to be the average diameter of the concave surfaces.

Table 3 shows the relationship between the viscosity (concentration) of the water-soluble resin and the average diameter of the concave surfaces for this embodiment.

TABLE 3

| Curable resin | Drying temperature, ° C. | Concentration, weight percent | Viscosity, mPa-sec | Coating speed, cm/sec | Ave. diameter, micrometers |
|---|---|---|---|---|---|
| PVA-205 | 60 to 25 | 5 | 9 | 16 | 72.05 |
| | | 10 | 40 | | 77.20 |
| | | 15 | 180 | | 83.33 |
| | | 20 | 500 | | 89.09 |
| | | 25 | 3000 | | 90.48 |
| | | 30 | 7000 | | 87.94 |

Example 3-4

A manufacturing process similar to that described for Example 3-1 was used. A 20 weight percent aqueous mixture of polyvinyl alcohol water-soluble resin (KURARY POVAL PVA-205 from Kurary Co., Ltd.) was prepared. Using the polypropylene mold as described in Example 2-1, six samples were prepared by coating the water-soluble resin on the mold at a thickness of 200 µm and with a coating speed of 16 cm/sec.

The first sample was dried for two hours in the oven at 25 degree C., the second sample was dried for two hours in the oven at 60 degree C., the third sample was dried for two hours in the oven at 80 degree C., the fourth sample was dried for two hours in the oven at 100 degree C., the fifth sample was dried for two hours in the oven at 120 degree C., and the sixth sample was dried for two hours in the oven at 140 degree C. Then, the six samples were dried at room temperature overnight, thus forming hardened layers. Thereafter, the hardened layers were removed from the polypropylene molds, thus obtaining six articles having concave surfaces made of a water-soluble resin.

In the SEM image of the concave surface portions observed substantially vertically above, the maximum diameters (diagonal distances in case of the samples dried at a temperature of 120 degree C. or more) of the concave surface portions whose shapes were measured at five positions. The average value of the measurements was determined to be the average diameter of the concave surfaces.

Table 4 shows the relationship between the drying temperature and the average diameter of the concave surfaces in one embodiment of the invention.

TABLE 4

| Curable Resin | Drying temperature, °C. | Concentration, weight percent | Coating speed cm/sec | Ave. diameter, micrometers |
|---|---|---|---|---|
| PVA-205 | 25 | 20 | 16 | 63.84 |
|  | 60 |  |  | 91.80 |
|  | 80 |  |  | 97.12 |
|  | 100 |  |  | 95.84 |
|  | 120 |  |  | 105.18 |
|  | 140 |  |  | 105.70 |

Example 3-5

As in Example 3-1, a 20 weight percent aqueous mixture of polyvinyl alcohol as a water-soluble resin (KURARY POVAL PVA-205 from Kurary Co., Ltd.) was prepared. Then, the solution was coated on the mold while entrapping air around the mold at the coating speeds of 1.44 cm/sec, 4.03 cm/sec, and 23.36 cm/sec.

Then, the three coating layers were dried for two hours in the oven at 60 degree C., and dried further at room temperature overnight, thus forming hardened layers. Thereafter, all of the hardened layers were removed from the polypropylene mold, thus obtaining articles having concave surfaces made of a water-soluble resin (article having an arranged pattern of concavities).

In the SEM images of the concave surface portions observed substantially vertically above, the maximum diameters of the concave surface portions were measured at five positions. The average value of the measurements was determined to be the average diameter of the concave surfaces.

Table 5 shows the relationship between the coating speed for the water-soluble resin mixture and the average diameter of the concave surfaces in one embodiment of the invention.

TABLE 5

| Curable Resin | Drying temperature, °C. | Concentration, weight percent | Coating speed, cm/sec | Ave. diameter, micrometers |
|---|---|---|---|---|
| PVA-205 | 60 to 25 | 20 | 23.36 | 95.13 |
|  |  |  | 4.03 | 94.44 |
|  |  |  | 1.44 | 90.55 |

Example 4-1

As the hardenable fluid in this example, a thermoplastic resin was used. More specifically, the thermoplastic resin was polyethylene, commercially available under the trade desig nation LDPEC13 from Eastman Chemical Japan Co., Ltd. A nickel sheet having a square lattice pattern of quadrangular pyramid depressions was used as the mold. These quadrangular pyramid depressions were 25 μm in depth, had an apex angle of 90 degree C., and a square bottom shape. Each side of the square bottom was 50 μm and the convexities were arranged at pitches of 50 μm. The nickel sheet was prepared as described in Example 2-4.

The thermoplastic resin was coated on the mold using a heated knife coater, thus forming a coating layer. More specifically, the thermoplastic resin was heated to a temperature (140 degree C.) at which the resin would have a sufficient fluidity, and was coated on the mold at a coating speed of 16 cm/sec to the thickness of 200 μm while trapping the air around the mold.

Then, the coating layer was cooled down to room temperature, thus forming a hardened layer. Thereafter, the hardened layer was removed from the nickel mold, thus obtaining an article having concave surfaces made of a thermoplastic resin (the article had an arranged pattern of concavities).

Example 4-2

Using the article having concave surfaces manufactured in Example 4-1 as the second mold, the UV curable resin which is the same as one used in Example 2-1 was coated on the second mold to the thickness of 200 μm. A 50 μm PET film was placed in contact with the UV curable resin and then pressed with a roller. A deaeration process was performed by reducing the atmosphere pressure in the same manner of Example 2-2. Then, the same ultraviolet lamp as used in Example 2-1 was used to irradiate the UV resin from the PET film side with ultraviolet rays of 3450 mJ/$cm^2$. The UV curable resin was polymerized to form a hardened layer. After polymerization, the hardened layer was removed from the second mold, thus obtaining an article made of a UV curable resin having convex surfaces (article having an arranged pattern of convexities).

Example 5-1

A multilayer film was provided that had a copper layer with a thickness of 5 μm on a polyimide sheet with a thickness of 75 μm. The film is commercially available under the trade designation TWO LAYER COPPER CLAD SUBSTRATE from Japan Interconnection Systems Limited. A laser beam was irradiated onto the polyimide side of the resulting multilayer film to form a depression, thus manufacturing a mold. The polyimide layer corresponds to the side wall portion (first layer 110a) and the copper layer corresponds to the bottom portion (second layer 110b) in FIG. 7A.

More specifically, Beam, Inc. (Tokyo, Japan) prepared the openings in the polyimide layer. An excimer laser beam was irradiated on the polyimide layer side using a mask to form an opening array pattern only in the polyimide layer and a surface of the copper layer was exposed at the bottom of each opening, thereby manufacturing a mold having depressions arranged in a square lattice pattern. Each depression had cylindrical concavities. In this case, a mold #1 and a mold #2 which have different arranged patterns as shown in Table 6 were prepared by two kinds of masks.

TABLE 6

| Mold | Pitch, micrometers | Diameter of opening, micrometers | | Thickness of Polyimide layer, micrometers | Thickness of Cu layer, micrometers |
|---|---|---|---|---|---|
| | | Top - Polyimide side | Bottom - Cu side | | |
| #1 | 250 | 151.63 | 137.01 | 75 | 5 |
| #2 | 80 | 50.54 | 36.34 | 75 | 5 |

The mold #1 had 100 depressions (10×10 lattice) in the form of cylindrical concavities formed at pitches of 250 μm, and each cylindrical concavity has a sectional shape with a diameter of 151.63 μm at a top surface side and a diameter of 137.01 μm at a bottom surface side (cupper layer side). The mold #2 has 100 depressions (10×10 lattice) in the form of cylindrical concavities formed at pitches of 80 μm, and each cylindrical concavity has a sectional shape with a diameter of 50.54 μm at a top surface side and a diameter of 36.34 μm at a bottom surface side (cupper layer side).

Figure 10A:
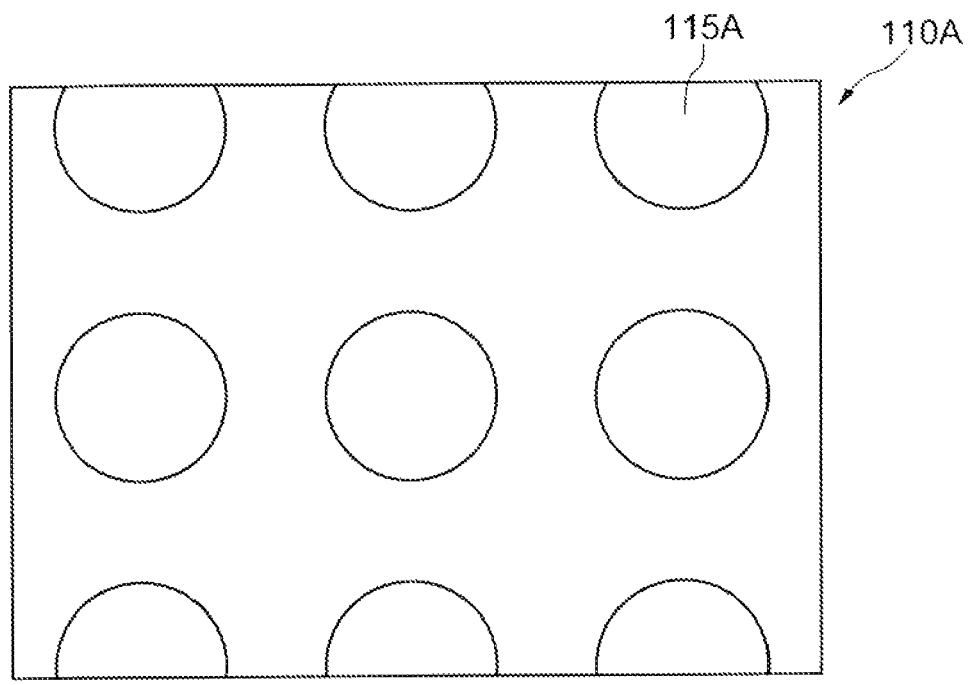
FIGS. 10A and 10B are schematic top views showing examples of a mold having multiple depressions arranged in a lattice pattern.
Figure 10B:
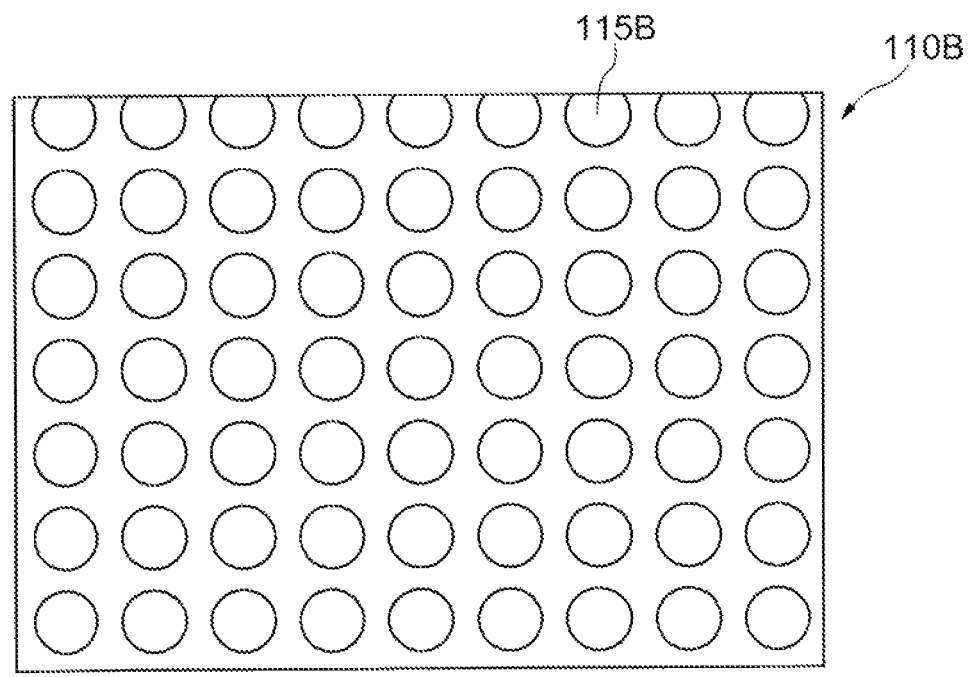

FIG. 10A is a plane view from the top showing the mold #1 (110A) having openings 115A and FIG. 10B is a plane view from the top showing the mold #2 (110B) having openings 115B.

Example 5-2

An article having concave surfaces was manufactured using the above mentioned mold #1. As a hardenable fluid for this example, a UV curable resin was prepared by mixing 90 parts by weight of a UV hardenable oligomer, polyester based urethane acrylate (commercially available under the trade designation EBECRYL 8402 from DAICEL-CYTEC Co., Ltd.), 10 parts by weight of an unsaturated aliphatic acid hydroxylalkylester modifier ε-carprolactone (commercially available under the trade designation PLACEL FA2D from Daicel Chemical Industries, Ltd.), and 1 parts by weight of a photo polymerization initiator (commercially available under the trade designation IRGACURE 2959 from CIBA Specialty Chemicals Inc.

An etchant for removing the cupper layer after forming a hardened coating layer was prepared by mixing 6.4 parts by weight hydrogen peroxide, 18 parts by weight concentrated sulfuric acid, 33 parts by weight copper sulfate, and 42.6 parts by weight distilled water.

The UV curable resin was coated on the mold using a knife coater, thereby forming a coating layer. More specifically, the UV curable resin was coated on the mold at a thickness of 200 μm while entrapping air around the mold at the coating speed of 16 cm/sec in the same manner of Example 2-1. Then, the UV curable resin was irradiated with ultraviolet rays of 3450 mJ/cm$^2$ using the ultraviolet lamp of Example 2-1. The UV curable resin was hardened (e.g., polymerized and cured).

After hardening, the copper layer (bottom portion) was removed using the etchant heated to 45 degree C. The resulting article was rinsed with distilled water. The article had concave surfaces (the article had an arranged pattern of concavities). FIG. 11 shows a perspective view of the obtained article 131'A having concave surfaces 132A. As the polyimide portion does not exist between adjacent concave surfaces arranged in a square lattice pattern in the article, the article having concave surfaces in which any groove-like portion did not exist between adjacent concave surfaces could be obtained.

An article having convex surfaces was manufactured using the article manufactured with concave surfaces. The curable resin was a mixture containing 20 weight percent polyvinyl)-alcohol as a water-soluble resin (commercially available under the trade designation KURARY POVAL PVA-217 from Kurary Co., Ltd.) and 80 weight percent distilled water. Using the article having concave surfaces manufactured in Example 5-1 as the second mold, the 20 weight percent PVA-217aqueous mixture was coated on the second mold to the thickness of 200 μm using a knife coater. A deaeration process was performed by reducing the atmosphere pressure in the same manner of Example 2-2.

The hardened layer was obtained by drying the coating layer for two hours in the oven at 60 degree C. and at room temperature (about 25 degree C.) overnight. After drying, the hardened layer was removed from the second mold, thus obtaining an article made of a polyvinyl alcohol resin having convex surfaces (the article had an arranged pattern of convexities). FIG. 12 shows a perspective view of the obtained article 161A having convex surfaces 162A.

Each convex surface of the article was not surrounded by a groove-like portion. That is, second article was obtained that had convex surfaces not surrounded by a horizontal wall.

Example 5-3

An article having concave surfaces was manufactured using the mold #2 instead of the mold #1. In this case, the article was manufactured using the same conditions Example 5-2 except for the mold.

Figure 13:
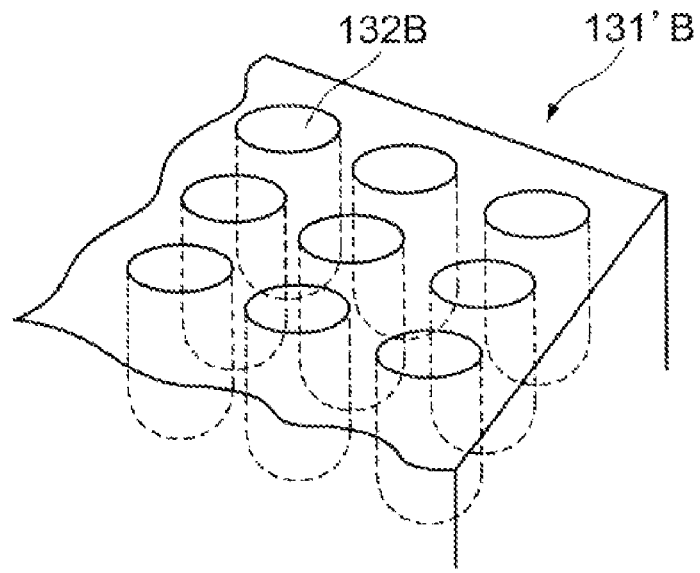
FIG. 13 is a schematic perspective view showing yet another example of an article having concavities arranged in a lattice pattern.

FIG. 13 shows a perspective view of the obtained article 131'B having concave surfaces 132B. As with the article prepared in Example 5-2, an article was obtained that had concave surfaces without groove-like portions between adjacent concave surfaces. An article having convex surfaces was manufactured using the article manufactured as mentioned above as a second mold. In this case, the second article was manufactured on the same conditions as the above mentioned Example 5-2 except for the second mold.

Figure 14:
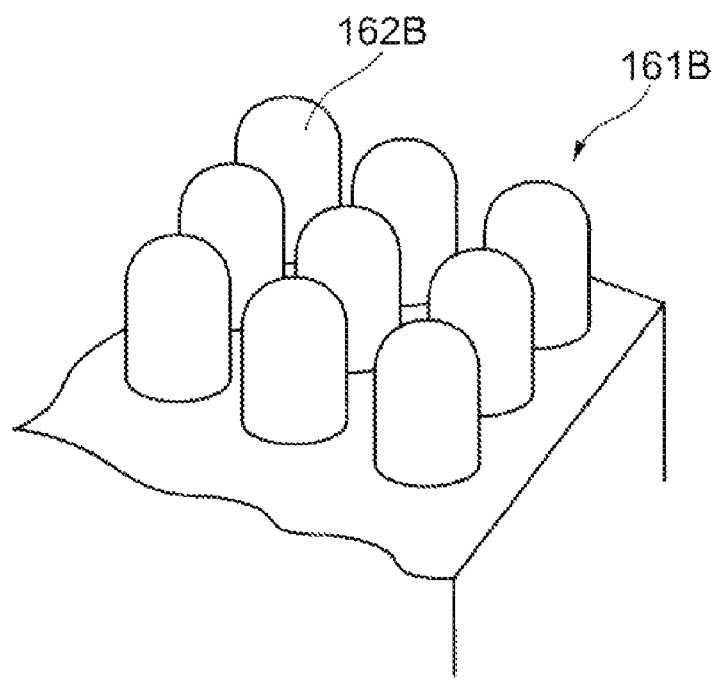
FIG. 14 is a schematic perspective view showing yet another example of a second article having convexities arranged in a lattice pattern.

FIG. 14 shows a perspective view of the obtained article 161B having convex surfaces 162B. As each concave surface of the second mold is not surrounded by a groove-like portion, the second article has convex surfaces that are not surrounded by a horizontal wall.

We claim:

1. A method of making an article that has a surface comprising at least one concavity, the method comprising using at least one gas bubble deliberately introduced to impart the at least one concavity to the surface of the article, wherein the using at least one gas bubble deliberately introduced comprises:
    (a) providing a hardenable fluid; and
    (b) molding the article from the hardenable fluid using a molding surface comprising at least a portion of an outer surface of a gas bubble, and
    wherein the molding surface comprises a plurality of gas bubbles arranged in a pattern on the molding surface.

2. The method of claim 1, further comprising removing the article from the mold.

3. A method of making an article that has a surface comprising at least one concavity, the method comprising using at least one gas bubble deliberately introduced to impart the at least one concavity to the surface of the article, wherein the method comprises:
    (a) providing a first mold that has a mold surface;
    (b) applying a hardenable fluid onto at least a portion of the mold surface;
    (c) deliberately introducing at least one gas bubble between the mold surface and the hardenable fluid; and (d) hardening the hardenable fluid to form the article having the at least one concavity on the surface thereof and imparted thereto by the at least one gas bubble.

4. The method of claim 3, wherein the mold comprises a multilayer construction having a first layer with at least one opening and a second layer laminated to the first layer and the gas bubble is in a depression formed by the opening in the first layer.

5. The method of claim 4, wherein the second layer is removed from the multilayer construction after hardening the hardenable fluid.

6. A method of making an article that has a surface comprising at least one concavity, the method comprising using at least one gas bubble deliberately introduced to impart the at least one concavity to the surface of the article, wherein the method comprises:
(a) providing a mold having a mold surface with a depression;
(b) applying a hardenable fluid onto at least a potion of the mold surface:
(c) entrapping a gas bubble between the mold surface and the hardenable fluid in the depression;
(d) hardening the hardenable fluid to form an article having a concavity on the surface thereof and imparted thereto by the gas bubble in the depression.

7. A method of making an article that has a surface comprising at least one concavity, the method comprising using at least one gas bubble deliberately introduced to impart the at least one concavity to the surface of the article, wherein the method comprises:
(a) providing a mold that has a mold surface;
(b) applying a hardenable fluid onto at least a portion of the mold surface;
(c) providing multiple gas bubbles at multiple, separate positions between the mold surface and the hardenable fluid, there the multiple, separate positions are selected based on an arranged pattern; and
(d) hardening the hardenable fluid to form an article having an arranged pattern of concavities on a surface thereof and imparted thereto by the gas bubbles.

8. The method of claim 7, wherein the mold comprises a multilayer construction having a first layer with an arranged pattern of openings and a second layer laminated to the first layer and the multiple gas bubbles are in an arranged pattern of depressions formed by the arranged pattern of opening in the first layer.

9. The method of claim 8, wherein the second layer is removed from the multilayer construction after hardening the hardenable fluid.

10. A method of making an article that has a surface comprising at least one concavity, the method comprising using at least one gas bubble deliberately introduced to impart the at least one concavity to the surface of the article, wherein the method comprises:
(a) providing a mold having a mold surface with multiple depressions arranged in a pattern;
(b) applying a hardenable fluid onto at least a portion of the mold surface;
(c) entrapping multiple gas bubbles between the mold surface and the hardenable fluid in the multiple depressions; and
(d) hardening the hardenable fluid to form an article having an arranged pattern of concavities on the surface thereof and imparted thereto by the multiple gas bubbles in the multiple depressions.

11. A method of manufacturing a second article that has a surface comprising at least one convexity, the method comprising:
(a) providing a first mold that has a mold surface;
(b) applying a hardenable fluid onto at least a portion of the mold surface;
(c) deliberately introducing at least one gas bubble between the mold surface and the hardenable fluid; and
(d) hardening the hardenable fluid to form a first article having the at least one concavity on the surface thereof and imparted thereto by the at least one gas bubble;
(e) removing the first article from the first mold;
(f) using the first mold having at least one concavity as a second mold to impart the at least one concavity to the surface of the second article.

12. The method of claim 11, wherein deliberately introducing at least one gas bubble comprises introducing multiple gas bubbles at multiple, separate positions selected based on an arranged pattern.

13. The method of claim 11, wherein deliberately introducing at least one gas bubble comprises entrapping the at least one gas bubble in a depression in the mold.

14. The method of claim 11, wherein deliberately introducing at least one gas bubble comprises entrapping a plurality of gas bubbles in an arranged pattern of depressions in the mold.

15. The method of claim 11, wherein the convexity has a spherical curvature.

16. The method of claim 11, wherein the second article has an arranged pattern of convexities and each convexity has a spherical curvature.

17. The method of claim 11, wherein the second article comprises a lens or an array of lenses.

* * * * *

UNITED STATES PATENT AND TRADEMARK OFFICE
CERTIFICATE OF CORRECTION

PATENT NO.      : 8,088,325 B2
APPLICATION NO. : 12/743350
DATED           : January 3, 2012
INVENTOR(S)     : Atsushi Toyota It is certified that error appears in the above-identified patent and that said Letters Patent is hereby corrected as shown below:

Column 4
Line 5, delete "micrlens" and insert -- microlens --, therefor.

Column 13
Line 61, delete "polypropyrene," and insert -- polypropylene, --, therefor.

Column 21
Line 48, delete "dearation" and insert -- deaeration --, therefor.
Line 49, delete "deareation" and insert -- deaeration --, therefor.

Column 25
Line 5, delete "polypropyrene," and insert -- polypropylene, --, therefor.

Column 26
Line 54, delete "E-carprolactone" and insert -- ε-caprolactone --, therefor.

Column 28
Line 24, delete "sherical" and insert -- spherical --, therefor.

Column 29
Line 8, delete "TETRON" and insert -- TETORON --, therefor.
Line 8, delete "Dupon" and insert -- Dupont --, therefor.
Line 53, delete "Kurary" and insert -- Kuraray --, therefor.
Line 54, delete "Kurary" and insert -- Kuraray --, therefor.
Line 62, delete "deareation," and insert -- deaeration, --, therefor.

Column 31
Line 4, delete "ELASTSIL" and insert -- ELASTOSIL --, therefor.
Line 16, delete each occurrence of "Kurary" and insert -- Kuraray --, therefor.

Signed and Sealed this
Third Day of April, 2012

David J. Kappos
*Director of the United States Patent and Trademark Office*

CERTIFICATE OF CORRECTION (continued)
U.S. Pat. No. 8,088,325 B2

Line 37, delete each occurrence of "Kurary" and insert -- Kuraray --, therefor.

Column 32
Line 11, delete "Kurary" and insert -- Kuraray --, therefor.
Line 52, delete "Kurary" and insert -- Kuraray --, therefor.
Line 53, delete "Kurary" and insert -- Kuraray --, therefor.

Column 33
Line 31, delete "Kurary" and insert -- Kuraray --, therefor.
Line 32, delete "Kurary" and insert -- Kuraray --, therefor.

Column 35
Line 36, delete "ε-carprolactone" and insert -- ε-caprolactone --, therefor.
Line 42, delete "cupper" and insert -- upper --, therefor.

Column 36
Line 1, delete "polyvinyl)-" and insert -- polyvinyl --, therefor.
Line 3, delete "Kurary" and insert -- Kuraray --, therefor.
Line 4, delete "Kurary" and insert -- Kuraray --, therefor.

Column 37
Line 19 (Approx.)-In Claim 6, delete "potion" and insert -- portion --, therefor.
Line 20 (Approx.)-In Claim 6, delete "surface:" and insert -- surface; --, therefor.